United States Patent
Vadapalli et al.

(10) Patent No.: US 12,302,286 B2
(45) Date of Patent: May 13, 2025

(54) TUNE AWAY OCCASION SUSPENSION FOR MULTI-SUBSCRIBER IDENTITY MODULE OPERATION

(71) Applicant: QUALCOMM Incorporated, San Diego, CA (US)

(72) Inventors: Syam Pavan Vadapalli, Visakhapatnam (IN); Roop Sagar Inakollu, Nellore (IN); AnkammaRao Ravuvari, Hyderabad (IN); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/550,089

(22) Filed: Dec. 14, 2021

(65) Prior Publication Data
US 2023/0189207 A1    Jun. 15, 2023

(51) Int. Cl.
    *H04W 68/02*      (2009.01)
    *H04W 88/02*      (2009.01)

(52) U.S. Cl.
    CPC ............ *H04W 68/02* (2013.01); *H04W 88/02* (2013.01)

(58) Field of Classification Search
    CPC .................................................... H04W 68/02
    USPC .......................................................... 455/458
    See application file for complete search history.

(56) References Cited

U.S. PATENT DOCUMENTS

| | | | |
|---|---|---|---|
| 2013/0172023 A1* | 7/2013 | Chan ...................... | H04W 76/28 455/466 |
| 2018/0042014 A1* | 2/2018 | Wu ........................ | H04W 88/06 |
| 2018/0288732 A1* | 10/2018 | Balasubramaniam ....... | H04W 76/19 |
| 2020/0304984 A1* | 9/2020 | Dhanapal .............. | H04W 76/19 |
| 2020/0396591 A1* | 12/2020 | Ou ........................ | H04W 24/08 |
| 2021/0250828 A1* | 8/2021 | Vaidya .................. | H04W 24/08 |

* cited by examiner

*Primary Examiner* — Joel Ajayi
(74) *Attorney, Agent, or Firm* — Holland & Hart LLP

(57) ABSTRACT

Methods, systems, and devices for wireless communications are described. In a wireless communications system, a user equipment (UE) may transmit, to a base station associated with a first subscription, first control signaling indicating a configuration for a set of tune away occasions in which the UE is to tune away from the first subscription to a second subscription to monitor for paging signaling for the second subscription. The UE may transmit second control signaling a suspension of one or multiple tune away occasions based on the configuration, the suspension indicating that the UE may refrain from tuning away from the first subscription during the tune away occasions. Based on transmitting the second control signaling, the UE may communicate data with the base station and refrain from monitoring for the paging signaling during the suspended tune away occasion.

30 Claims, 17 Drawing Sheets

TUNE AWAY OCCASION SUSPENSION FOR MULTI-SUBSCRIBER IDENTITY MODULE OPERATION

FIELD OF TECHNOLOGY

The following relates to wireless communications, including tune away occasion suspension for multi-subscriber identity module operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a multi-subscriber identity module (MSIM) wireless device may communicate with a base station using different subscriptions. In some examples, the MSIM wireless device may tune away from a first subscription to a second subscription during a tune away occasion based on a type of communications the MSIM wireless device is performing. However, techniques for tuning away from the first subscription to the second subscription may be improved.

SUMMARY

The described techniques relate to improved methods, systems, devices, and apparatuses that support tune away occasion suspension for multi-subscriber identity module operation. Generally, the described techniques provide for a user equipment (UE) to indicate a suspension of an upcoming tune away occasion to a base station such that the base station may schedule uplink and downlink communications with the UE for a first subscription (e.g., a dedicated data subscription (DDS)) during the suspended tune away occasion. For example, the UE may have performance and reliability enhancements by retaining resources for the first subscription rather than using the resources to tune away to a second subscription during a scheduled tune away occasion. As such, the UE may suspend the tune away occasion and continue to use it for the first subscription rather than for the second subscription.

In some examples, the UE may configure (e.g., or the base station may configure the UE with) a set of tune away occasions in which the UE is to tune away from the first subscription to a second subscription (e.g., a non-DDS (nDDS)) to monitor for paging signaling associated with the second subscription. The UE may indicate a suspension of at least one tune away occasion to the base station, where the base station may be associated with the first subscription. For example, the UE may transmit control signaling to the base station to indicate the suspension of the tune away occasion such that the UE may retain resources during the tune away occasion for the first subscription. The UE may communicate data associated with the first subscription with the base station during the suspended tune away occasion, improving the available resources for data communications.

A method for wireless communications at a UE is described. The method may include transmitting, to a base station associated with a first subscription of the UE, first control signaling indicating a configuration for a set of multiple tune away occasions in which the UE is to monitor for paging signaling associated with a second subscription of the UE, transmitting, to the base station associated with the first subscription, second control signaling indicating a suspension of a tune away occasion of the set of multiple tune away occasions based on the configuration, and communicating data with the base station associated with the first subscription in the suspended tune away occasion based on transmitting the second control signaling.

An apparatus for wireless communications at a UE is described. The apparatus may include a processor, memory coupled with the processor, and instructions stored in the memory. The instructions may be executable by the processor to cause the apparatus to transmit, to a base station associated with a first subscription of the UE, first control signaling indicating a configuration for a set of multiple tune away occasions in which the UE is to monitor for paging signaling associated with a second subscription of the UE, transmit, to the base station associated with the first subscription, second control signaling indicating a suspension of a tune away occasion of the set of multiple tune away occasions based on the configuration, and communicate data with the base station associated with the first subscription in the suspended tune away occasion based on transmitting the second control signaling.

Another apparatus for wireless communications at a UE is described. The apparatus may include means for transmitting, to a base station associated with a first subscription of the UE, first control signaling indicating a configuration for a set of multiple tune away occasions in which the UE is to monitor for paging signaling associated with a second subscription of the UE, means for transmitting, to the base station associated with the first subscription, second control signaling indicating a suspension of a tune away occasion of the set of multiple tune away occasions based on the configuration, and means for communicating data with the base station associated with the first subscription in the suspended tune away occasion based on transmitting the second control signaling.

A non-transitory computer-readable medium storing code for wireless communications at a UE is described. The code may include instructions executable by a processor to transmit, to a base station associated with a first subscription of the UE, first control signaling indicating a configuration for a set of multiple tune away occasions in which the UE is to monitor for paging signaling associated with a second subscription of the UE, transmit, to the base station associated with the first subscription, second control signaling indicating a suspension of a tune away occasion of the set of multiple tune away occasions based on the configuration, and communicate data with the base station associated with the first subscription in the suspended tune away occasion based on transmitting the second control signaling.

In some examples of the method, apparatuses, and non-transitory computer-readable medium described herein, transmitting the second control signaling may include operations, features, means, or instructions for transmitting the second control signaling indicating the suspension of a subset of multiple tune away occasions of the set of multiple tune away occasions based on the configuration.

In some examples of the method, apparatuses, and non-transitory computer-readable medium described herein, the subset of multiple tune away occasions may be consecutive in time within the set of multiple tune away occasions.

In some examples of the method, apparatuses, and non-transitory computer-readable medium described herein, transmitting the second control signaling may include operations, features, means, or instructions for transmitting the second control signaling indicating an offset for the suspension, where the subset of multiple tune away occasions may be suspended after the offset following transmitting the second control signaling.

In some examples of the method, apparatuses, and non-transitory computer-readable medium described herein, the offset includes a quantity of tune away occasions, a threshold time, or both.

In some examples of the method, apparatuses, and non-transitory computer-readable medium described herein, the second control signaling includes a field indicating a quantity of suspended tune away occasions for the subset of multiple tune away occasions, a set of multiple indices corresponding to the suspended tune away occasions of the subset of multiple tune away occasions, or both.

In some examples of the method, apparatuses, and non-transitory computer-readable medium described herein, transmitting the second control signaling may include operations, features, means, or instructions for transmitting the second control signaling including a bit, where a value of the bit indicates the suspension of a next tune away occasion of the set of multiple tune away occasions.

In some examples of the method, apparatuses, and non-transitory computer-readable medium described herein, scheduling transmission of the second control signaling based on a threshold notification time and the suspended tune away occasion, where the second control signaling may be transmitted based on the scheduling.

Some examples of the method, apparatuses, and non-transitory computer-readable medium described herein may further include operations, features, means, or instructions for receiving, from the base station, third control signaling configuring the threshold notification time, where the scheduling may be based on the third control signaling.

In some examples of the method, apparatuses, and non-transitory computer-readable medium described herein, scheduling the transmission may include operations, features, means, or instructions for scheduling the transmission of the second control signaling in advance of a start of the suspended tune away occasion, an end of the suspended tune away occasion, or both according to the threshold notification time.

In some examples of the method, apparatuses, and non-transitory computer-readable medium described herein, transmitting the second control signaling may include operations, features, means, or instructions for transmitting a medium access control (MAC) control element (CE) indicating the suspension of the tune away occasion of the set of multiple tune away occasions.

In some examples of the method, apparatuses, and non-transitory computer-readable medium described herein, transmitting the second control signaling may include operations, features, means, or instructions for transmitting layer 1 (L1) signaling indicating the suspension of the tune away occasion of the set of multiple tune away occasions.

In some examples of the method, apparatuses, and non-transitory computer-readable medium described herein, transmitting the first control signaling may include operations, features, means, or instructions for transmitting radio resource control (RRC) signaling indicating the configuration for the set of multiple tune away occasions.

In some examples of the method, apparatuses, and non-transitory computer-readable medium described herein, the configuration for the set of multiple tune away occasions defines a periodicity of the set of multiple tune away occasions, a duration for each tune away occasion of the set of multiple tune away occasions, or both.

Some examples of the method, apparatuses, and non-transitory computer-readable medium described herein may further include operations, features, means, or instructions for monitoring for the paging signaling associated with the second subscription during a first tune away occasion of the set of multiple tune away occasions based on the configuration and refraining from monitoring for the paging signaling associated with the second subscription during the suspended tune away occasion based on the suspension.

In some examples of the method, apparatuses, and non-transitory computer-readable medium described herein, the first subscription of the UE corresponds to a first universal subscriber identity module (USIM) in a connected mode and the second subscription of the UE corresponds to a second USIM in an idle mode.

In some examples of the method, apparatuses, and non-transitory computer-readable medium described herein, the first subscription of the UE corresponds to a DDS and the second subscription of the UE corresponds to an nDDS.

A method for wireless communications at a base station is described. The method may include receiving, from a UE associated with a first subscription, first control signaling indicating a configuration for a set of multiple tune away occasions in which the UE is to monitor for paging signaling associated with a second subscription of the UE, receiving, from the UE, second control signaling indicating a suspension of a tune away occasion of the set of multiple tune away occasions based on the configuration, and communicating data with the UE associated with the first subscription in the suspended tune away occasion based on receiving the second control signaling.

An apparatus for wireless communications at a base station is described. The apparatus may include a processor, memory coupled with the processor, and instructions stored in the memory. The instructions may be executable by the processor to cause the apparatus to receive, from a UE associated with a first subscription, first control signaling indicating a configuration for a set of multiple tune away occasions in which the UE is to monitor for paging signaling associated with a second subscription of the UE, receive, from the UE, second control signaling indicating a suspension of a tune away occasion of the set of multiple tune away occasions based on the configuration, and communicate data with the UE associated with the first subscription in the suspended tune away occasion based on receiving the second control signaling.

Another apparatus for wireless communications at a base station is described. The apparatus may include means for receiving, from a UE associated with a first subscription, first control signaling indicating a configuration for a set of multiple tune away occasions in which the UE is to monitor for paging signaling associated with a second subscription of the UE, means for receiving, from the UE, second control signaling indicating a suspension of a tune away occasion of the set of multiple tune away occasions based on the configuration, and means for communicating data with the UE associated with the first subscription in the suspended tune away occasion based on receiving the second control signaling.

A non-transitory computer-readable medium storing code for wireless communications at a base station is described. The code may include instructions executable by a processor to receive, from a UE associated with a first subscription, first control signaling indicating a configuration for a set of multiple tune away occasions in which the UE is to monitor for paging signaling associated with a second subscription of the UE, receive, from the UE, second control signaling indicating a suspension of a tune away occasion of the set of multiple tune away occasions based on the configuration, and communicate data with the UE associated with the first subscription in the suspended tune away occasion based on receiving the second control signaling.

In some examples of the method, apparatuses, and non-transitory computer-readable medium described herein, receiving the second control signaling may include operations, features, means, or instructions for receiving the second control signaling indicating the suspension of a subset of multiple tune away occasions of the set of multiple tune away occasions based on the configuration.

In some examples of the method, apparatuses, and non-transitory computer-readable medium described herein, receiving the second control signaling may include operations, features, means, or instructions for receiving the second control signaling indicating an offset for the suspension, where the subset of multiple tune away occasions may be suspended after the offset following receiving the second control signaling.

In some examples of the method, apparatuses, and non-transitory computer-readable medium described herein, the second control signaling includes a field indicating a quantity of suspended tune away occasions for the subset of multiple tune away occasions, a set of multiple indices corresponding to the suspended tune away occasions of the subset of multiple tune away occasions, or both.

In some examples of the method, apparatuses, and non-transitory computer-readable medium described herein, receiving the second control signaling may include operations, features, means, or instructions for receiving the second control signaling including a bit, where a value of the bit indicates the suspension of a next tune away occasion of the set of multiple tune away occasions.

Some examples of the method, apparatuses, and non-transitory computer-readable medium described herein may further include operations, features, means, or instructions for transmitting, to the UE, third control signaling configuring a threshold notification time, where the second control signaling may be received based on the threshold notification time, a start of the suspended tune away occasion, an end of the suspended tune away occasion, or a combination thereof.

In some examples of the method, apparatuses, and non-transitory computer-readable medium described herein, the second control signaling includes a MAC-CE.

In some examples of the method, apparatuses, and non-transitory computer-readable medium described herein, the second control signaling includes L1 signaling.

Some examples of the method, apparatuses, and non-transitory computer-readable medium described herein may further include operations, features, means, or instructions for refraining from communicating data with the UE associated with the first subscription in a first tune away occasion of the set of multiple tune away occasions based on the configuration.

DETAILED DESCRIPTION

Figure 1:
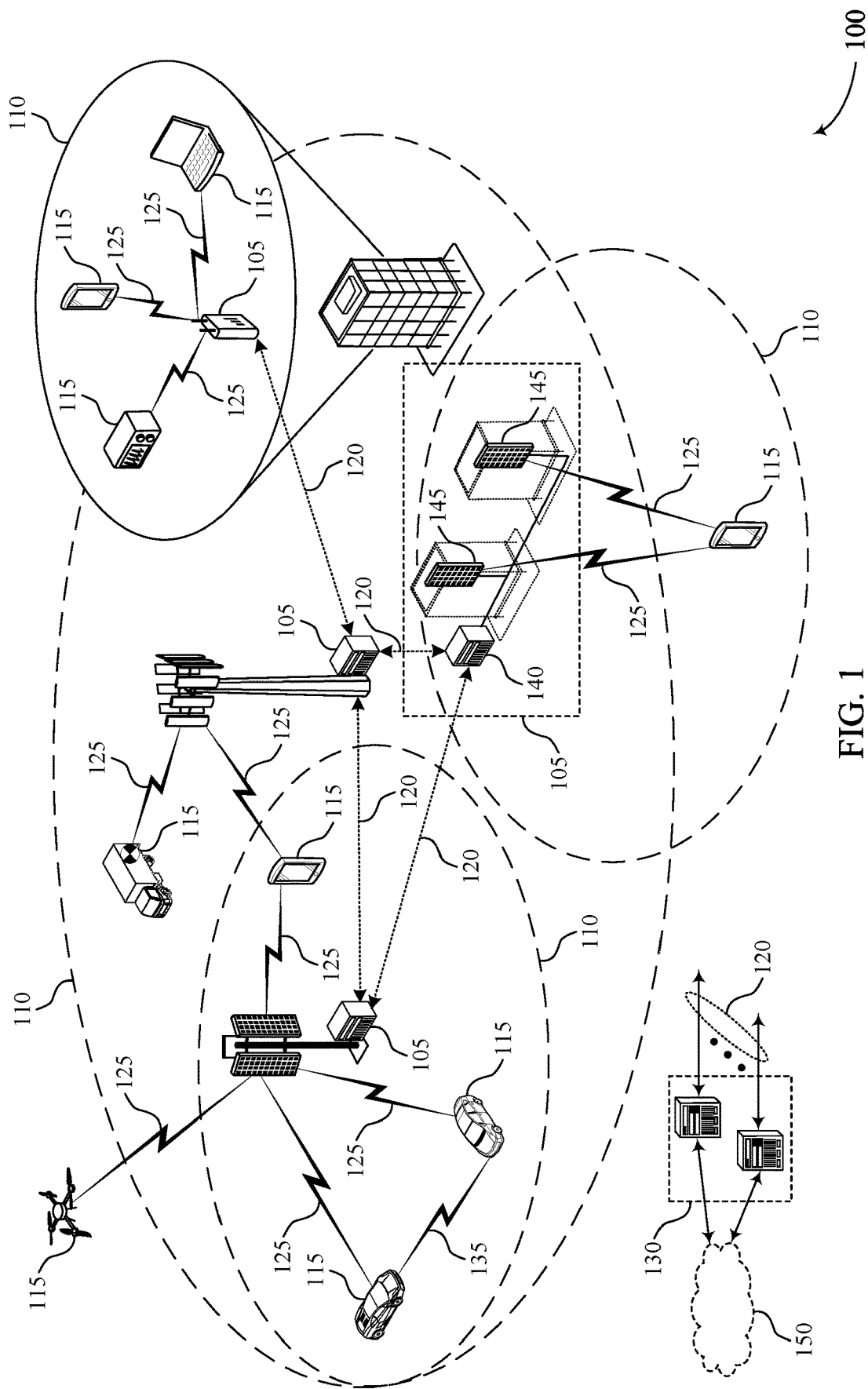
FIG. 1 illustrates an example of a wireless communications system that supports tune away occasion suspension for multi-subscriber identity module operation in accordance with aspects of the present disclosure.

A user equipment (UE) (e.g., a multi-subscriber identify module (MSIM) UE) may be associated with a first subscription and a second subscription. For example, the first subscription may be a dedicated data subscription (DDS) and the second subscription may be a non-DDS (nDDS). The UE may use periodic tune away occasions (e.g., tune away gaps) to tune away from the first subscription to the second subscription, for example, to monitor for paging messages associated with the second subscription. In some cases, the UE may transmit information to a base station indicating a periodicity and a duration of the tune away occasions. Once the base station has received the information, the base station may refrain from scheduling uplink and downlink communications for the first subscription during the tune away occasions. That is, during the tune away occasions when the UE tunes away from the first subscription to the second subscription, the base station may refrain from communicating with the UE using the first subscription, leaving the first subscription unused. However, restricting the first subscription during the tune away occasions may limit the UE from retraining corresponding resources for the first subscription, which may decrease performance and throughput for the first subscription and result in resource inefficiencies.

Techniques described herein enable a UE to indicate a suspension of an upcoming tune away occasion to a base station such that the base station may schedule uplink and downlink communications with the UE for a first subscription (e.g., a DDS) during the suspended tune away occasion. For example, the UE may have performance and reliability enhancements by retaining resources for the first subscription rather than using the resources to tune away to a second subscription during a scheduled tune away occasion. As such, the UE may suspend the tune away occasion and continue to use it for the first subscription rather than for the second subscription.

In some examples, the UE may configure (e.g., or the base station may configure the UE with) a set of tune away occasions in which the UE is to tune away from the first subscription to a second subscription (e.g., an nDDS) to monitor for paging signaling associated with the second subscription. The UE may indicate a suspension of at least one tune away occasion to the base station, where the base station may be associated with the first subscription. For example, the UE may transmit control signaling to the base station to indicate the suspension of the tune away occasion such that the UE may retain resources during the tune away occasion for the first subscription. The UE may communicate data associated with the first subscription with the base station during the suspended tune away occasion, improving the available resources for data communications.

Aspects of the disclosure are initially described in the context of wireless communications systems. Aspects of the disclosure are then described in the context of tune away schemes and process flows. Aspects of the disclosure are further illustrated by and described with reference to apparatus diagrams, system diagrams, and flowcharts that relate to tune away occasion suspension for multi-subscriber identity module operation.

FIG. 1 illustrates an example of a wireless communications system 100 that supports tune away occasion suspension for multi-subscriber identity module operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 (e.g., an MSIM UE) may be associated with a first subscription and a second subscription. For example, the first subscription may be a DDS (e.g., corresponding to a universal SIM (USIM) A in a connected mode) and the second subscription may be an nDDS (e.g., corresponding to a USIM B in an idle mode or an inactive mode). In some examples, the DDS may be used for data communications (e.g., messaging applications, email applications) and the nDDS may be used for voice communications (e.g., voice calls). Additionally or alternatively, the first subscription and the second subscription may share resources available for a corresponding wireless device (e.g., a UE 115). In some cases, the UE 115 may use periodic tune away occasions (e.g., tune away gaps) to tune away from the first subscription to the second subscription, for example, to monitor for paging messages associated with the second subscription.

In some cases, for an MSIM UE operating in a dual SIM dual standby (DSDS) system, tune away occasions may be opened to enable the UE to monitor for paging messages associated with the nDDS. That is, in a DSDS system, the UE 115 may tune away from the first subscription to the second subscription during a periodic tune away occasion to monitor for paging messages (e.g., voice calls) associated with the second subscription, while maintaining an RRC connection to the first subscription. In some examples, if the UE 115 is actively using the first subscription, then the first subscription may be in a connected mode using available resources shared between the first subscription and the second subscription, and the second subscription may be in an idle mode. If the UE 115 tunes away to the second subscription, then the second subscription may be in a connected mode using the available resources shared between the first subscription and the second subscription, and the first subscription may be in an idle mode.

In some examples, the base station 105 may configure the paging occasions for a subscription in an idle mode (e.g., the second subscription) based on a discontinuous reception (DRX) cycle (e.g., 320 milliseconds (ms), 640 ms). For example, the periodicity of the tune away occasions may be based on the DRX cycle. During each tune away occasion, the UE 115 may tune away from the first subscription to the second subscription to detect incoming pages associated with the second subscription. In some examples, during a tune away occasion and when the UE 115 is tuned away to the second subscription, the base station 105 may continue to transmit data for the first subscription to the UE 115, which may result in a failure during the tune away occasion. For example, the UE 115 may fail to decode the data because the UE 115 is tuned away to the second subscription.

To prevent the base station 105 from transmitting data to the UE 115 for the first subscription during a tune away occasion, the UE 115 may communicate information to the base station 105 indicating the periodic outages associated with the tune away occasions. The UE 115 may use the first subscription to transmit signaling (e.g., RRC signaling) to the base station 105 to indicate the information regarding the periodic tune away occasions. For example, the UE 115 may inform the base station 105 of the periodic paging occasions for the second subscription and indicate a configuration of the tune away occasions (e.g., tune away config) via an information element (e.g., scheduling gap). Since the tune away occasions happen periodically, the scheduling gap in the configuration may be applied periodically. The configuration may include information related to the periodicity of the tune away occasions, the duration of the tune away occasions, and other information. In some examples, the periodicity and the duration of the tune away occasions may vary depending on which radio access technology is associated with each subscription (e.g., the DDS may operate in NR and the nDDS may operate in LTE).

Once the base station 105 becomes aware of the configuration, the base station 105 may refrain from scheduling uplink and downlink communications on the first subscription during the tune away occasions (e.g., to prevent the communications from failing). However, the lack of communications on the first subscription during the tune away occasions may disable the base station 105 and the UE 115 from efficiently scheduling communications. For example, in some cases, the UE 115 may have performance enhancements by using the first subscription during the tune away occasions instead of tuning away to the second subscription. Additionally or alternatively, a tune away occasion may be opened regardless of whether the second subscription may utilize the tune away occasion for receiving and decoding paging messages. If the base station 105 is unaware that the tune away occasion is unused (e.g., aborted), the base station 105 may continue to refrain from scheduling uplink and downlink transmissions associated with the first subscription, which may leave both the first and second subscriptions unused. However, if the UE 115 communicates to the base station 105 about the unused tune away occasions (e.g., gap suspension occasions) in advance, then the base station 105 may utilize the suspended tune away occasions for scheduling uplink and downlink communications with the UE 115 for the first subscription. In addition, base station 105 may transmit repetitions of paging messages for the second subscription, which may enable the second subscription to maintain paging performance during the suspended tune away occasions.

To retain resource during a tune away occasion for the first subscription, the UE 115 may transmit information to the base station 105 regarding a suspension of an upcoming tune away occasion. The suspension may enable the base station 105 to schedule uplink and downlink communications with the UE 115 for a first subscription (e.g., a DDS) during the suspended tune away occasion. For example, the UE 115 may have performance and reliability enhancements by retaining resources for the first subscription rather than using the resources to tune away to a second subscription during a scheduled tune away occasion. As such, the UE 115 may suspend the tune away occasion and continue to use it for the first subscription rather than for the second subscription.

In some examples, the UE 115 may configure (e.g., or the base station 105 may configure the UE 115 with) a set of tune away occasions in which the UE 115 is to tune away from the first subscription to a second subscription (e.g., an nDDS) to monitor for paging signaling associated with the second subscription. The UE 115 may indicate a suspension of at least one tune away occasion to the base station 105, where the base station 105 may be associated with the first subscription. For example, the UE 115 may transmit control signaling to the base station to indicate the suspension of the tune away occasion such that the UE 115 may retain resources during the tune away occasion for the first subscription. The UE 115 may communicate data associated with the first subscription with the base station 105 during the suspended tune away occasion, improving the available resources for data communications.

Figure 2:
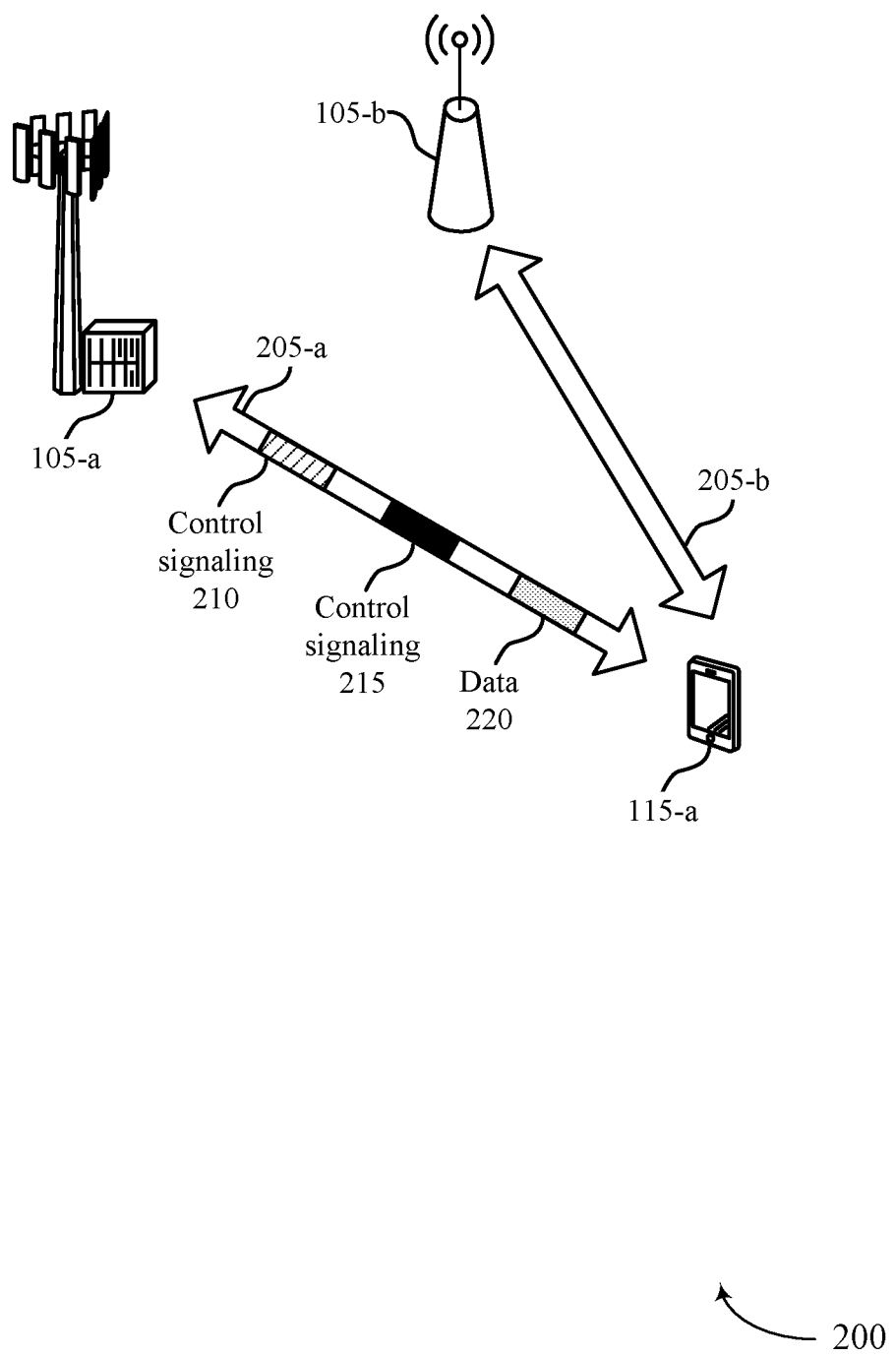
FIG. 2 illustrates an example of a wireless communications system that supports tune away occasion suspension for multi-subscriber identity module operation in accordance with aspects of the present disclosure.

FIG. 2 illustrates an example of a wireless communications system 200 that supports tune away occasion suspension for multi-subscriber identity module operation in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-a, a base station 105-a, and a base station 105-b, which may be examples of corresponding devices described herein. In some examples, the base station 105-a may support a first subscription (e.g., a DDS) and the base station 105-b may support a second subscription (e.g., an nDDS).

In some examples, the UE 115-a (e.g., an MSIM UE) may communicate with the base stations 105 via communications links 205. For example, the UE 115-a may communicate with the base station 105-a via the first subscription using a communications link 205-a, and the UE 115-a may communicate with the base station 105-b via the second subscription using a communications link 205-b. In some examples, the UE 115-a may perform data communications (e.g., text messages, emails) with the base station 105-a and voice communications (e.g., voice calls) with the base station 105-b.

In some cases, the UE 115-a may transmit control signaling 210 (e.g., RRC signaling) to the base station 105-a indicating a configuration for a set of tune away occasions in which the UE 115-a is to tune away from the first subscription to the second subscription monitor for paging signaling associated with the second subscription. During a tune away occasion, the UE 115-a may tune away to the second subscription such that the UE 115-a may monitor for pages (e.g., voice calls) from the base station 105-b. The control signaling may indicate a periodicity of the tune away occasions, a duration of a tune away occasion, or both. For example, the periodicity of the tune away occasions may be based on a DRX cycle length (e.g., 320 ms, 640 ms), and the duration of a tune away occasion may be 25 ms. As described herein, in some cases, the UE 115-a may have performance enhancements by retaining data communications with the base station 105-a associated with the first subscription during a tune away occasion rather than tuning away to the second subscription.

To retain the resources associated with an upcoming tune away occasion for the first subscription, the UE 115-a may transmit control signaling 215 to the base station 105-a indicating a suspension of the upcoming tune away occasion based on configuration for the quantity of tune away occasions. For example, using the first subscription, the UE 115-a may inform the base station 105-a about the suspension of the upcoming tune occasion, which may enable the base station 105-a to schedule uplink and downlink communications with the UE 115-a for the first subscription more efficiently. In some cases, the control signaling 215 may indicate the suspension of multiple tune away occasions. Additionally or alternatively, the control signaling 215 may include a MAC control element (MAC-CE) or layer 1 (L1) signaling.

In some examples, based on transmitting the control signaling 215, the UE 115-a may communicate data 220 with the base station 105-a associated with the first subscription during the suspended tune away occasion rather than tuning away to the second subscription. As such, the UE 115-a may skip monitoring for pages during the suspended tune away occasion. To prevent a decrease in performance for the second subscription (e.g., to prevent the UE 115-a from missing a voice call) during the suspended tune away occasion, the base station 105-b may transmit repetitions of paging messages to the UE 115-a for the second subscription.

Figure 3:
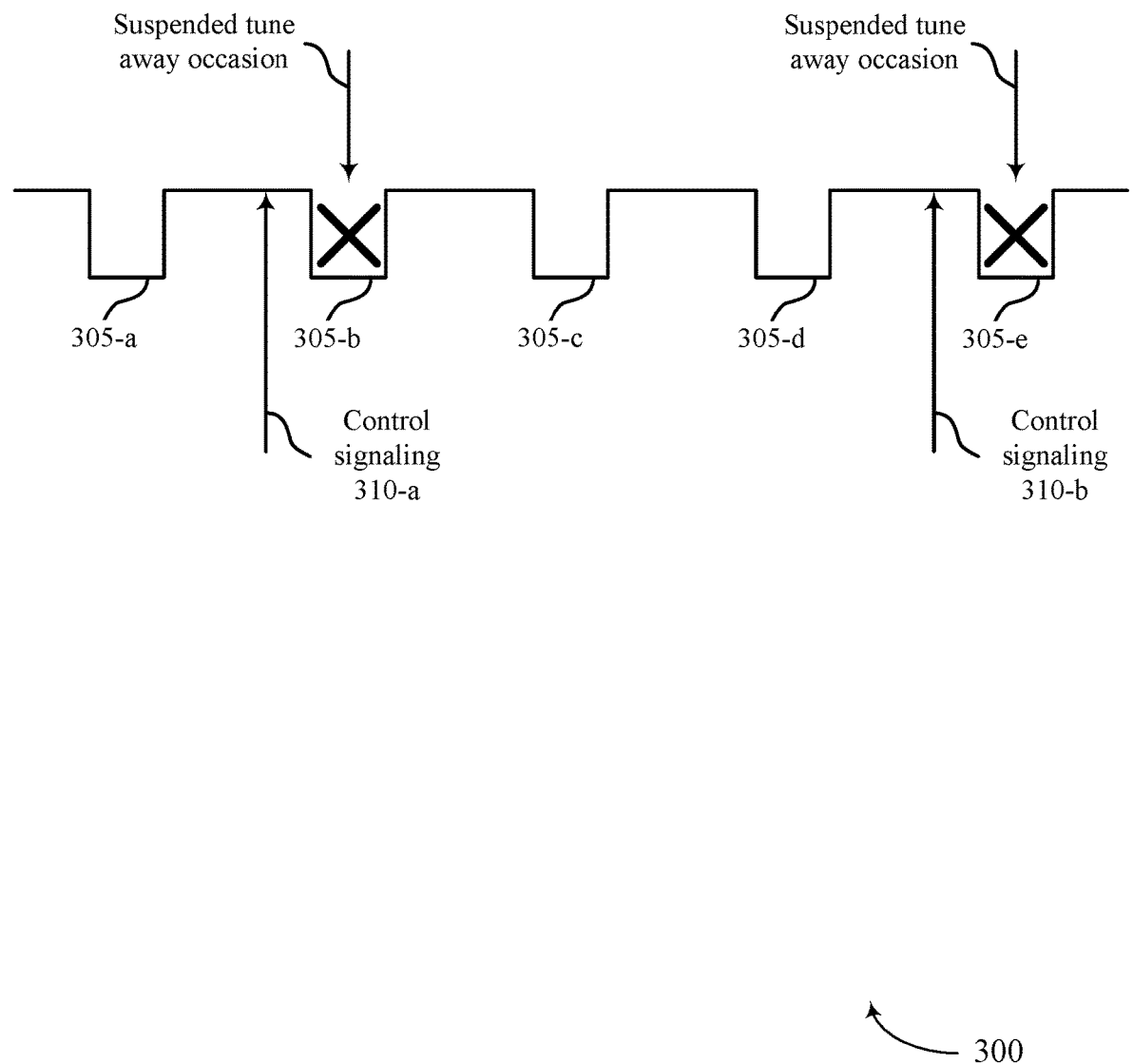
FIG. 3 illustrates an example of a tune away scheme that supports tune away occasion suspension for multi-subscriber identity module operation in accordance with aspects of the present disclosure.

FIG. 3 illustrates an example of a tune away scheme 300 that supports tune away occasion suspension for multi-subscriber identity module operation in accordance with aspects of the present disclosure. In some examples, the tune away scheme 300 may implement aspects of the wireless communications systems 100 and 200 or may be implemented by aspects of the wireless communications systems 100 and 200.

As described herein, a UE may communicate with a first base station associated with a first subscription (e.g., a DDS) and a second base station associated with a second subscription (e.g., an nDDS). In some examples, the first base station or the UE may configure a quantity of tune away occasions 305 in which the UE is to tune away from the first subscription to the second subscription to monitor for paging signaling (e.g., voice calls) associated with the second subscription. For example, the base station or the UE may configure a tune away occasion 305-a, a tune away occasion 305-b, a tune away occasion 305-c, a tune away occasion 305-d, and a tune away occasion 305-e. To retain the resources associated with an upcoming tune away occasion 305 for the first subscription rather than using the resources to tune away to the second subscription, the UE may transmit control signaling to the first base station indicating a suspension of the upcoming tune away occasion 305. Based on indicating the suspension of the upcoming tune away occasion 305, the UE may communicate data with the first base station associated with the first subscription during the suspended tune away occasion 305.

In some examples, the UE may transmit control signaling 310 to inform the first base station about the suspension of the upcoming tune away occasion 305. For example, the UE may tune away from the first subscription to monitor for paging signaling on the second subscription during the tune away occasion 305-a. Prior to the tune away occasion 305-b, the UE may transmit control signaling 310-a indicating a suspension of the tune away occasion 305-b. In some examples, the UE may transmit the control signaling 310-a based on the second subscription refraining from using the tune away occasion 305-b for receiving and decoding paging signaling, leaving the tune away occasion 305-b open for use by the first subscription.

Additionally or alternatively, the UE may tune away from the first subscription to the second subscription during the tune away occasion 305-c and the tune away occasion 305-d. Prior to the tune away occasion 305-e, the UE may transmit control signaling 310-b to the first base station indicating a suspension of the tune away occasion 305-e such that the first base station may continue to schedule uplink and downlink transmissions with the UE during the suspended tune away occasion 305-d. In some examples, the control signaling 310 may include a MAC-CE or L1 signaling indicating the suspension of a tune away occasion 305 (e.g., and corresponding skipping of paging signaling). The L1 signaling may include uplink control information (UCI) transmitted via a physical uplink control channel (PUCCH) or a physical uplink shared channel (PUSCH).

In some examples, the UE may determine to suspend a tune away occasion 305 based on the priority of a data communication associated with the first subscription versus the paging signaling associated with the second subscription. For example, if the data communication (e.g., a payment transaction) has a higher priority than the paging signaling (e.g., a phone call), then the UE may determine to suspend the corresponding tune away occasion 305 such that the UE may communicate the higher priority data during the tune away occasion 305. Additionally or alternatively, the UE may determine to suspend a tune away occasion 305 if a data communication associated with the first subscription is a low latency communication, if the data communication is not completed before the tune away occasion 305, or any combination thereof. Once the UE has determined to suspend the tune away occasion 305, the UE may transmit the control signaling 310 to the first base station to indicate that the first base station may continue the data communication with the UE during the tune away occasion 305.

The control signaling 310 may indicate the suspension of a subset of multiple tune away occasions 305 of the set of tune away occasions 305, where the subset of multiple tune away occasions 305 may be consecutive in time within the set of tune away occasions 305. For example, the UE may transmit the control signaling 310 (e.g., a MAC-CE, L1 signaling) to indicate a suspension of one tune away occasion 305 or N tune away occasions 305. In some examples, the N tune away occasions 305 may be consecutive tune away occasions 305 after the UE transmits the control signaling 310. In some cases, the UE may transmit the control signaling 310 indicating an offset for the suspension, where the subset of the multiple tune away occasions 305 may be suspended after the offset following the transmission of the control signaling 310. The offset may include a quantity of tune away occasions 305, a threshold time, or both. For example, the N tune away occasions 305 may be consecutive tune away occasions 305 starting M tune away occasions 305 after the control signaling 310 transmission, where M may be configured by the UE or the base station or indicated in the control signaling 310. In some cases, the control signaling 310 may indicate N specific tune away occasions 305 that may be suspended (e.g., which may be consecutive or random).

In an example, ten (e.g., N) DRX cycles and corresponding tune away occasions 305 may be configured for the second subscription over a time period (e.g., 5 seconds). The UE may determine that out of the 10 tune away occasions 305, the second subscription may use even-numbered tune away occasions 305 within the time period for receiving and decoding paging signaling. As such, the control signaling 310 may indicate the suspension of odd-numbered tune away occasions 305 within the time period for communicating data with the first base station. That is, instead of transmitting the control signaling 310 immediately before each upcoming tune away occasion 305 that is being suspended, the UE may transmit the control signaling 310 one time to indicate multiple upcoming tune away occasion suspensions.

In some examples, the control signaling 310 may include a field indicating a quantity of suspended tune away occasions 305 for the subset of multiple tune away occasions 305, a set of indices corresponding to the suspended tune away occasions 305, or both. For example, if the UE uses a MAC-CE (e.g., a PUSCH) to convey the control signaling to the first base station, the MAC-CE may carry additional information for the first base station, such as the N number of tune away occasions 305 the UE is suspending. In some cases, the control signaling 310 may include a bit, where a value of the bit may indicate the suspension of a next tune away occasion 305 of the set of tune away occasions 305. For example, if the UE uses L1 signaling to convey the control signaling to the first base station, the L1 signaling may carry compact information such as a one-bit indication of the N number of tune away occasions 305 the UE is suspending (e.g., if N=M=1, preconfigured values).

In some examples, the first base station may configure a threshold (e.g., minimum) advance notification time (e.g., threshold notification time) before which the UE may transmit the control signaling 310 (e.g., a MAC-CE or L1 signaling). For example, the base station may transmit control signaling to the UE configuring the threshold advance notification time. The threshold advance notification time may ensure that the first base station refrains from receiving the control signaling 310 too early or too late (e.g., and consequently fails to suspend a tune away occasion 305 indicated in the control signaling 310). As such, the UE may schedule transmission of the control signaling 310 based on the threshold notification time indicated by the base station and the suspended tune away occasion such that the UE may transmit the control signaling 310 based on the scheduling.

In some examples, the threshold advance notification time may be defined relative to the beginning of a tune away occasion 305, relative to the end of the tune away occasion 305, as a function of the beginning and the end of the tune away occasion 305, or any combination thereof. For example, if the tune away occasion 305-*b* is sufficiently long, even if the UE transmits the control signaling 310-*a* relatively close to or after the beginning of the tune away occasion 305-*b*, then the first base station may still schedule something in the remaining portion of the tune away occasion 305-*b*. That is, if the UE suspends the tune away occasion 305-*b* to transmit data to the first base station, and if the data transmission is completed in a relatively short period of time compared to the length of the tune away occasion 305-*b*, then the first base station may use the remainder of the tune away occasion 305-*b* to perform another data communication with the UE.

Figure 4:
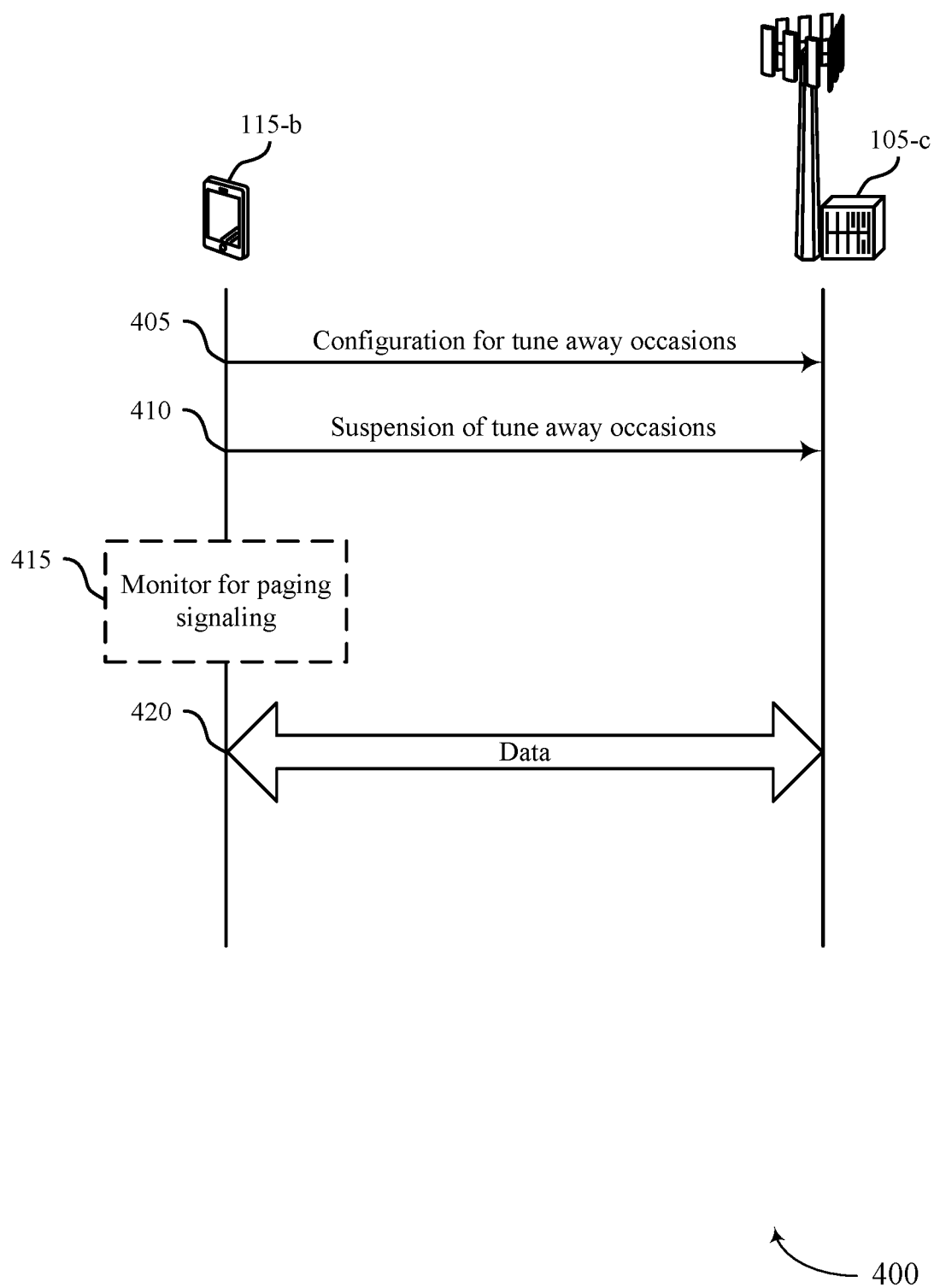
FIG. 4 illustrates an example of a process flow that supports tune away occasion suspension for multi-subscriber identity module operation in accordance with aspects of the present disclosure.

FIG. 4 illustrates an example of a process flow 400 that supports tune away occasion suspension for multi-subscriber identity module operation in accordance with aspects of the present disclosure. The process flow 400 may implement aspects of wireless communications systems 100 and 200, or may be implemented by aspects of the wireless communications system 100 and 200. For example, the process flow 400 may illustrate operations between a UE 115-*b* and a base station 105-*c*, which may be examples of corresponding devices described herein. In the following description of the process flow 400, the operations between the UE 115-*b* and the base station 105-*c* may be transmitted in a different order than the example order shown, or the operations performed by the UE 115-*b* and the base station 105-*c* may be performed in different orders or at different times. Some operations may also be omitted from the process flow 400, and other operations may be added to the process flow 400.

At 405, the UE 115-*b* may transmit, to the base station 105-*c* associated with a first subscription of the UE 115-*b* (e.g., a DDS), first control signaling indicating a configuration for a set of tune away occasions in which the UE 115-*b* is to monitor for paging signaling associated with a second subscription (e.g., nDDS) of the UE 115-*b*. For example, during a tune away occasion, the UE 115-*b* may tune away from the first subscription to the second subscription to monitor for the paging signaling (e.g., voice calls).

At 410, the UE 115-*b* may transmit, to the base station 105-*c* associated with the first subscription, second control signaling indicating a suspension of a tune away occasion of the set of tune away occasions based on the configuration. In some examples, the second control signaling may include a MAC-CE or L1 signaling. Additionally or alternatively, the second control signaling may indicate a suspension of multiple tune away occasions, which may be consecutive in time or after an offset following the second control signaling. By transmitting the second control signaling, the UE 115-*b* may indicate to the base station 105-*c* that the UE 115-*b* may refrain from tuning away to the second subscription during the tune away occasion in favor of continuing communications with the base station 105-*c* for the first subscription based on a priority of the communications, a timing of the communications, or any combination thereof.

At 415, the UE 115-*b* may monitor for the paging signaling associated with the second subscription during a first tune away occasion of the set of tune away occasions based on the configuration. For example, if the second control signaling failed to indicate the suspension of the first tune away occasion, then the UE 115-*b* may tune away to the second subscription during the first tune away occasion and monitor for paging signaling. Additionally or alternatively, the UE 115-*b* may refrain from monitoring for the paging signaling associated with the second subscription during the suspended tune away occasion based on the suspension indicated in the second control signaling.

At 420, the UE 115-*b* may communicate data with the base station 105-*c* associated with the first subscription in the suspended tune away occasion based on transmitting the second control signaling. That is, instead of tuning away from the first subscription to the second subscription during a tune away occasion, the UE 115-*b* may suspend the tune away occasion and continue to communicate data for the first subscription.

Figure 5:
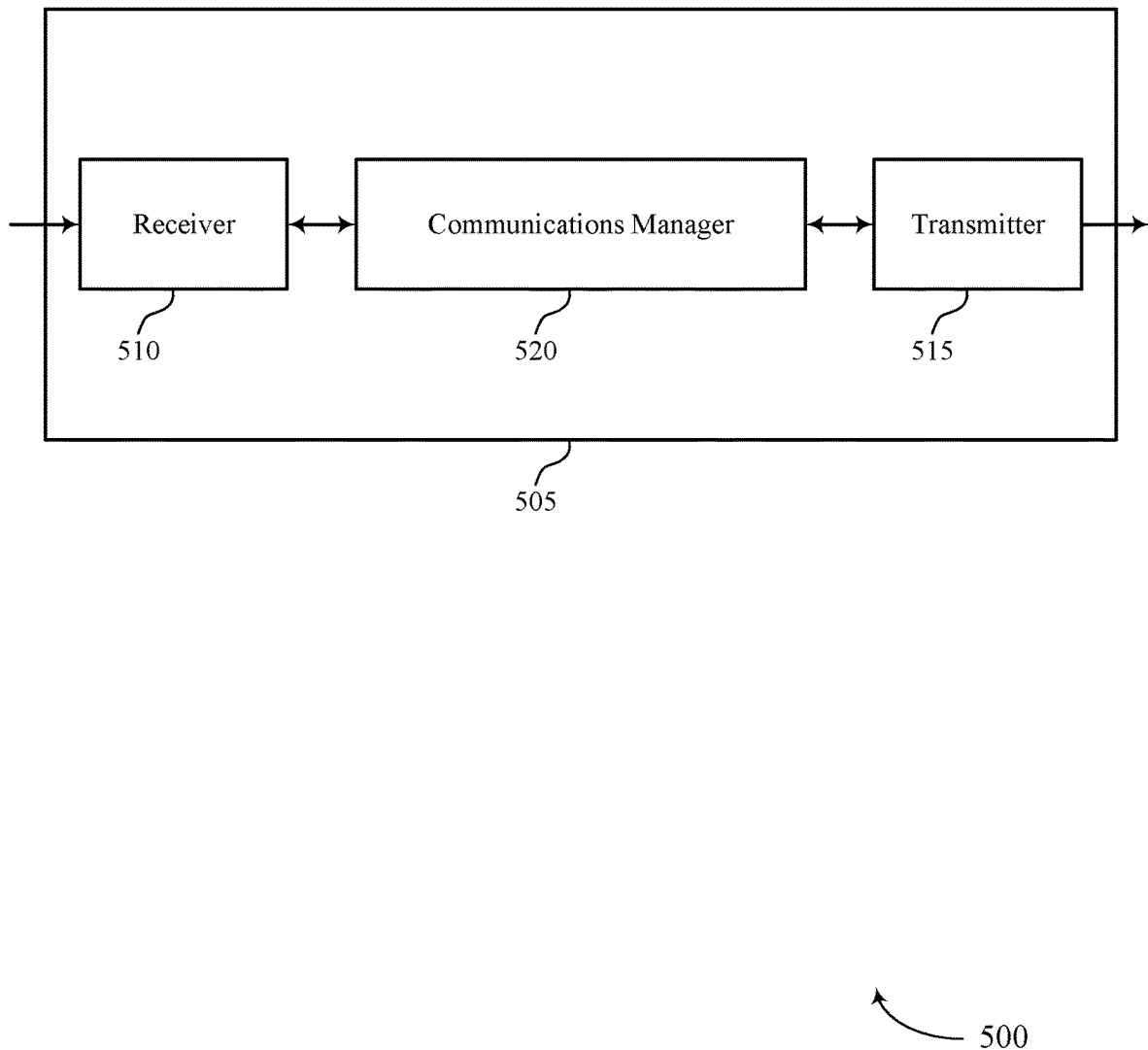
FIGS. 5 and 6 show block diagrams of devices that support tune away occasion suspension for multi-subscriber identity module operation in accordance with aspects of the present disclosure.

FIG. 5 shows a block diagram 500 of a device 505 that supports tune away occasion suspension for multi-subscriber identity module operation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to tune away occasion suspension for multi-subscriber identity module operation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to tune away occasion suspension for multi-subscriber identity module operation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of tune away occasion suspension for multi-subscriber identity module operation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for transmitting, to a base station associated with a first subscription of the UE, first control signaling indicating a configuration for a set of multiple tune away occasions in which the UE is to monitor for paging signaling associated with a second subscription of the UE. The communications manager 520 may be configured as or otherwise support a means for transmitting, to the base station associated with the first subscription, second control signaling indicating a suspension of a tune away occasion of the set of multiple tune away occasions based on the configuration. The communications manager 520 may be configured as or otherwise support a means for communicating data with the base station associated with the first subscription in the suspended tune away occasion based on transmitting the second control signaling.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for suspending one or multiple tune away occasions, which may enable a UE to use a first subscription instead of tuning away to a second subscription during a tune away occasion. As such, the described techniques may increase resource efficiency and enhance the performance and reliability of communications.

Figure 6:
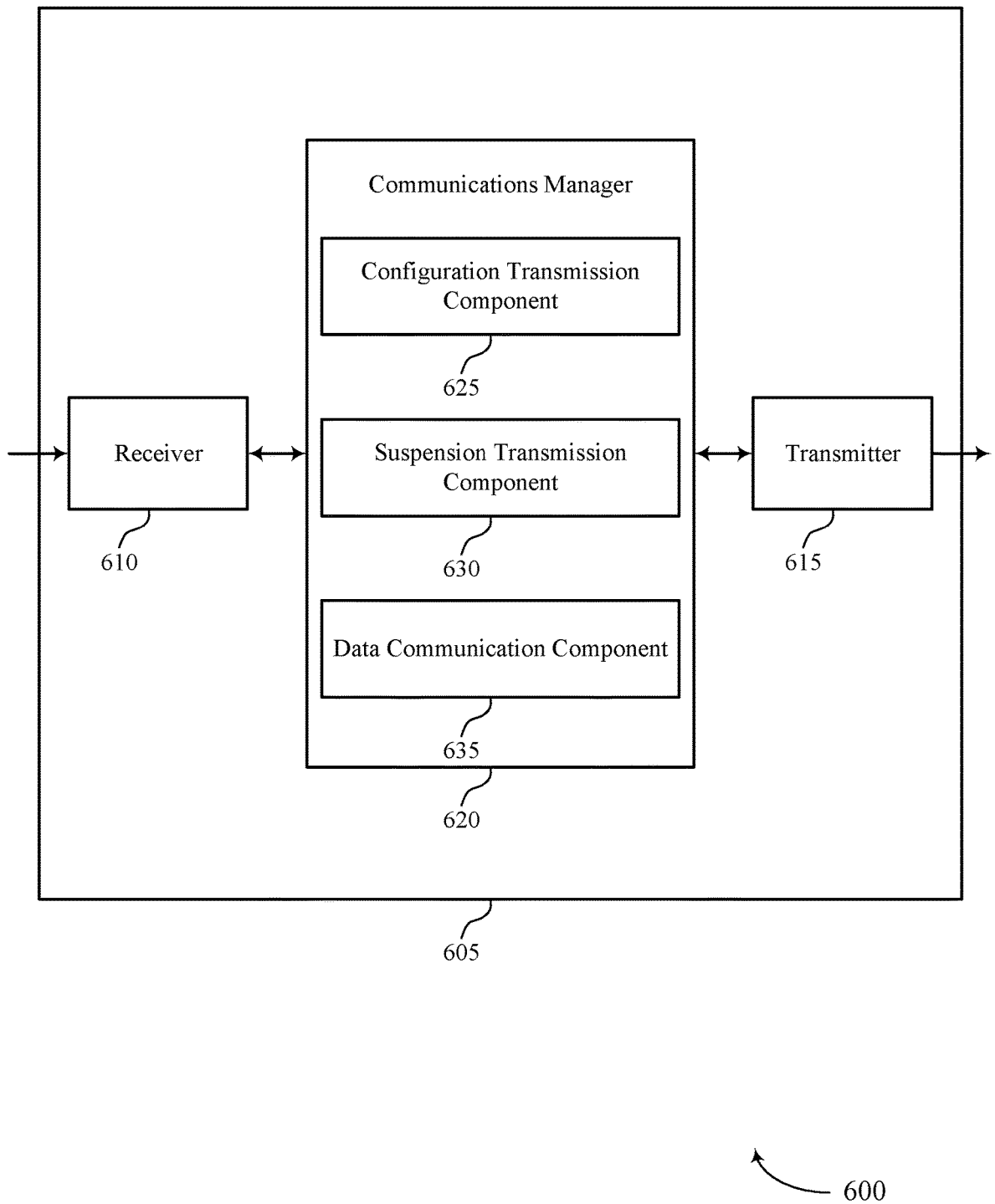

FIG. 6 shows a block diagram 600 of a device 605 that supports tune away occasion suspension for multi-subscriber identity module operation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to tune away occasion suspension for multi-subscriber identity module operation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to tune away occasion suspension for multi-subscriber identity module operation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of tune away occasion suspension for multi-subscriber identity module operation as described herein. For example, the communications manager 620 may include a configuration transmission component 625, a suspension transmission component 630, a data communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The configuration transmission component 625 may be configured as or otherwise support a means for transmitting, to a base station associated with a first subscription of the UE, first control signaling indicating a configuration for a set of multiple tune away occasions in which the UE is to monitor for paging signaling associated with a second subscription of the UE. The suspension transmission component 630 may be configured as or otherwise support a means for transmitting, to the base station associated with the first subscription, second control signaling indicating a suspension of a tune away occasion of the set of multiple tune away occasions based on the configuration. The data communication component 635 may be configured as or otherwise support a means for communicating data with the base station associated with the first subscription in the suspended tune away occasion based on transmitting the second control signaling.

Figure 7:
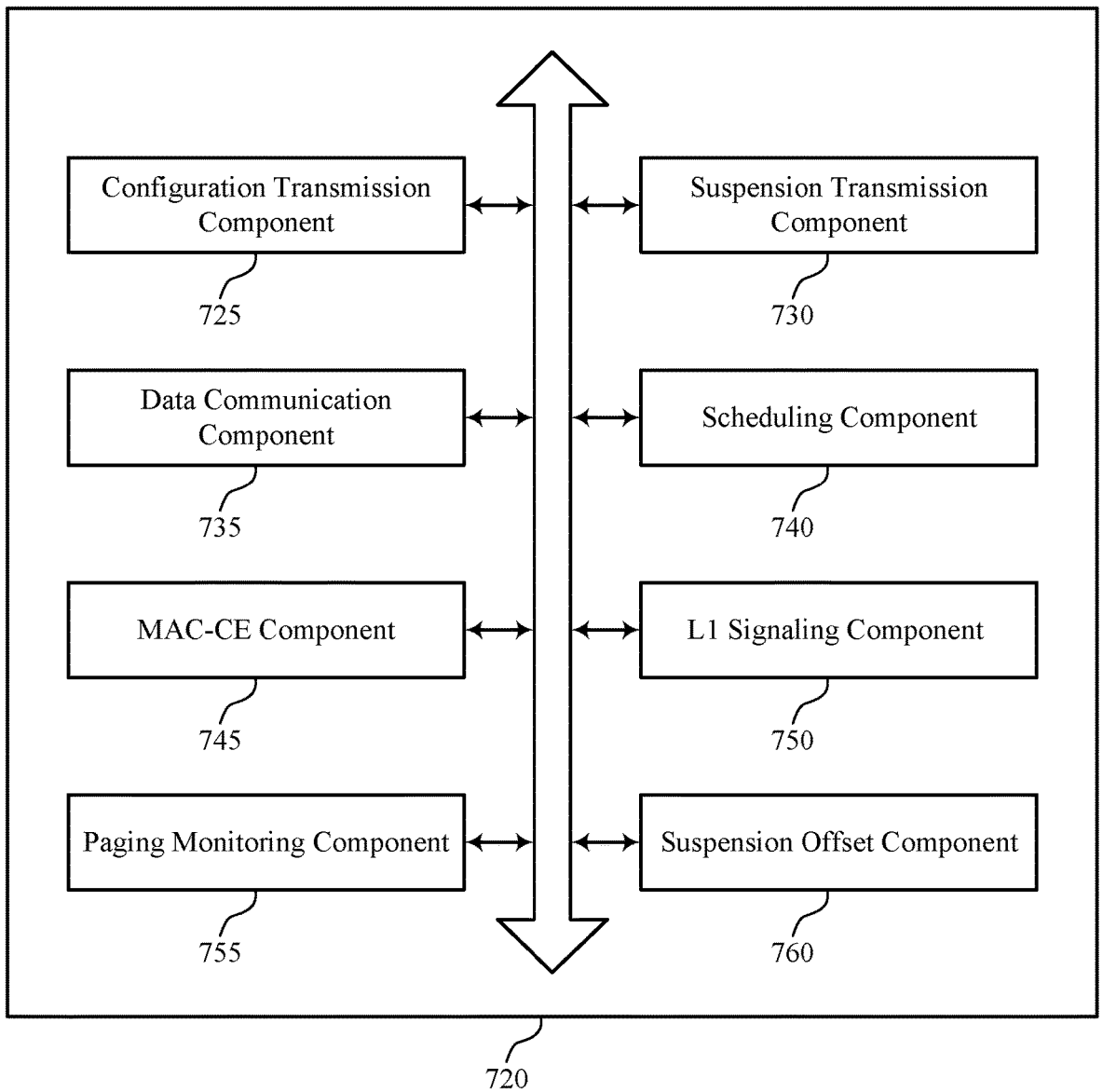
FIG. 7 shows a block diagram of a communications manager that supports tune away occasion suspension for multi-subscriber identity module operation in accordance with aspects of the present disclosure.

FIG. 7 shows a block diagram 700 of a communications manager 720 that supports tune away occasion suspension for multi-subscriber identity module operation in accordance with aspects of the present disclosure. The communications manager 720 may be an example of aspects of a communications manager 520, a communications manager 620, or both, as described herein. The communications manager 720, or various components thereof, may be an example of means for performing various aspects of tune away occasion suspension for multi-subscriber identity module operation as described herein. For example, the communications manager 720 may include a configuration transmission component 725, a suspension transmission component 730, a data communication component 735, a scheduling component 740, a MAC-CE component 745, a L1 signaling component 750, a paging monitoring component 755, a suspension offset component 760, or any combination thereof. Each of these components may communicate, directly or indirectly, with one another (e.g., via one or more buses).

The communications manager 720 may support wireless communications at a UE in accordance with examples as disclosed herein. The configuration transmission component 725 may be configured as or otherwise support a means for transmitting, to a base station associated with a first subscription of the UE, first control signaling indicating a configuration for a set of multiple tune away occasions in which the UE is to monitor for paging signaling associated with a second subscription of the UE. The suspension transmission component 730 may be configured as or otherwise support a means for transmitting, to the base station associated with the first subscription, second control signaling indicating a suspension of a tune away occasion of the set of multiple tune away occasions based on the configuration. The data communication component 735 may be configured as or otherwise support a means for communicating data with the base station associated with the first subscription in the suspended tune away occasion based on transmitting the second control signaling.

In some examples, to support transmitting the second control signaling, the suspension transmission component 730 may be configured as or otherwise support a means for transmitting the second control signaling indicating the suspension of a subset of multiple tune away occasions of the set of multiple tune away occasions based on the configuration. In some examples, the subset of multiple tune away occasions are consecutive in time within the set of multiple tune away occasions.

In some examples, to support transmitting the second control signaling, the suspension offset component 760 may be configured as or otherwise support a means for transmitting the second control signaling indicating an offset for the suspension, where the subset of multiple tune away occasions are suspended after the offset following transmitting the second control signaling. In some examples, the offset includes a quantity of tune away occasions, a threshold time, or both.

In some examples, the second control signaling includes a field indicating a quantity of suspended tune away occasions for the subset of multiple tune away occasions, a set of multiple indices corresponding to the suspended tune away occasions of the subset of multiple tune away occasions, or both.

In some examples, to support transmitting the second control signaling, the suspension transmission component 730 may be configured as or otherwise support a means for transmitting the second control signaling including a bit, where a value of the bit indicates the suspension of a next tune away occasion of the set of multiple tune away occasions.

In some examples, the scheduling component 740 may be configured as or otherwise support a means for scheduling transmission of the second control signaling based on a threshold notification time and the suspended tune away occasion, where the second control signaling is transmitted based on the scheduling.

In some examples, the scheduling component 740 may be configured as or otherwise support a means for receiving, from the base station, third control signaling configuring the threshold notification time, where the scheduling is based on the third control signaling.

In some examples, to support scheduling the transmission, the scheduling component 740 may be configured as or otherwise support a means for scheduling the transmission of the second control signaling in advance of a start of the suspended tune away occasion, an end of the suspended tune away occasion, or both according to the threshold notification time.

In some examples, to support transmitting the second control signaling, the MAC-CE component 745 may be configured as or otherwise support a means for transmitting a MAC-CE indicating the suspension of the tune away occasion of the set of multiple tune away occasions.

In some examples, to support transmitting the second control signaling, the L1 signaling component 750 may be configured as or otherwise support a means for transmitting L1 signaling indicating the suspension of the tune away occasion of the set of multiple tune away occasions.

In some examples, to support transmitting the first control signaling, the configuration transmission component 725 may be configured as or otherwise support a means for transmitting RRC signaling indicating the configuration for the set of multiple tune away occasions.

In some examples, the configuration for the set of multiple tune away occasions defines a periodicity of the set of multiple tune away occasions, a duration for each tune away occasion of the set of multiple tune away occasions, or both.

In some examples, the paging monitoring component 755 may be configured as or otherwise support a means for monitoring for the paging signaling associated with the second subscription during a first tune away occasion of the set of multiple tune away occasions based on the configuration. In some examples, the paging monitoring component 755 may be configured as or otherwise support a means for refraining from monitoring for the paging signaling associated with the second subscription during the suspended tune away occasion based on the suspension.

In some examples, the first subscription of the UE corresponds to a first universal subscriber identity module in a connected mode and the second subscription of the UE corresponds to a second universal subscriber identity module in an idle mode. In some examples, the first subscription of the UE corresponds to a DDS and the second subscription of the UE corresponds to an nDDS.

Figure 8:
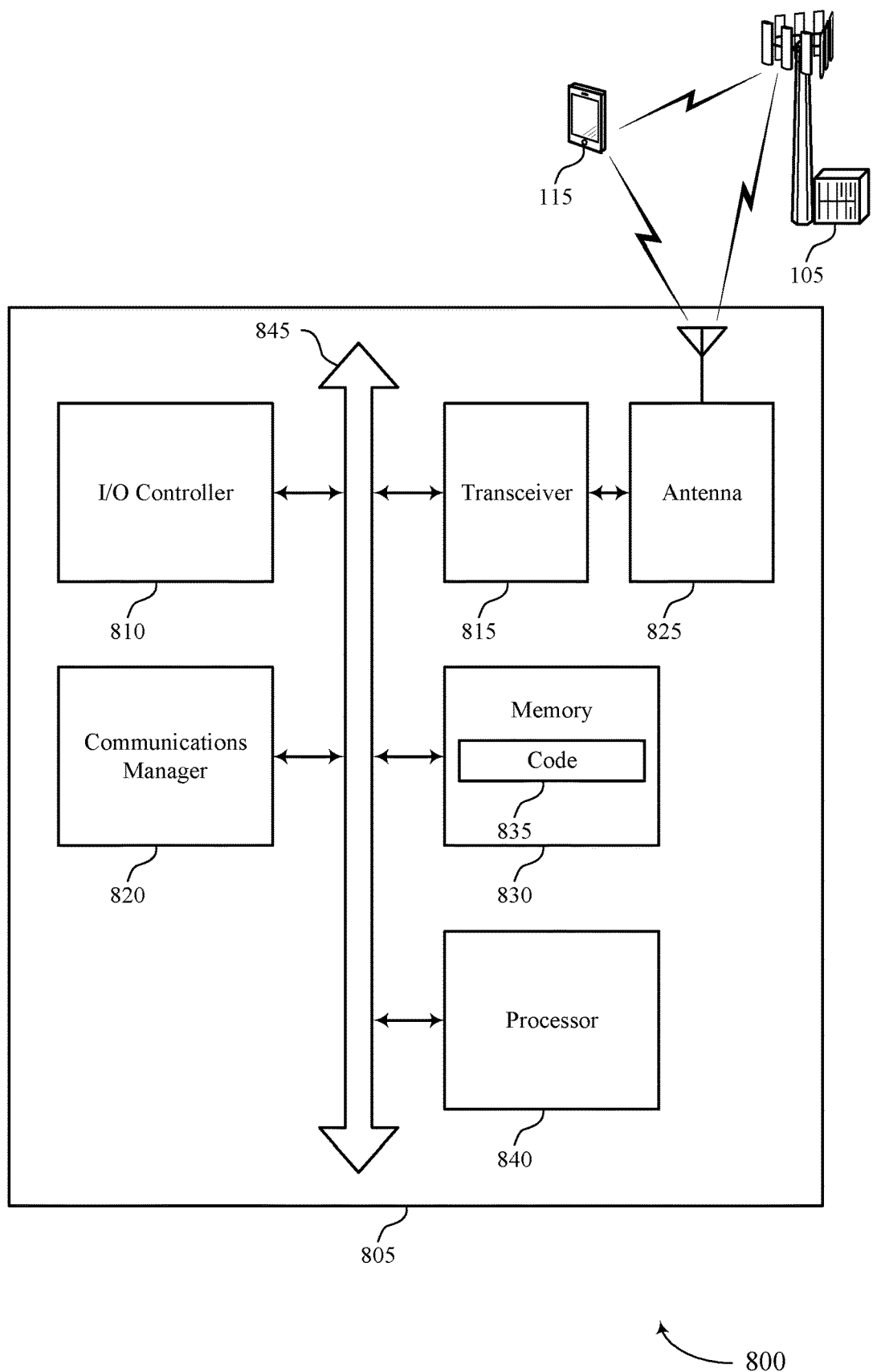
FIG. 8 shows a diagram of a system including a device that supports tune away occasion suspension for multi-subscriber identity module operation in accordance with aspects of the present disclosure.

FIG. 8 shows a diagram of a system 800 including a device 805 that supports tune away occasion suspension for multi-subscriber identity module operation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting tune away occasion suspension for multi-subscriber identity module operation). For example, the device 805 or a component of the device 805 may include a processor 840 and memory 830 coupled with the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting, to a base station associated with a first subscription of the UE, first control signaling indicating a configuration for a set of multiple tune away occasions in which the UE is to monitor for paging signaling associated with a second subscription of the UE. The communications manager 820 may be configured as or otherwise support a means for transmitting, to the base station associated with the first subscription, second control signaling indicating a suspension of a tune away occasion of the set of multiple tune away occasions based on the configuration. The communications manager 820 may be configured as or otherwise support a means for communicating data with the base station associated with the first subscription in the suspended tune away occasion based on transmitting the second control signaling.

By including or configuring the communications manager 820 in accordance with examples as described herein, the device 805 may support techniques for suspending one or multiple tune away occasions, which may enable a UE to use a first subscription instead of tuning away to a second subscription during a tune away occasion. As such, the described techniques may increase resource efficiency and enhance the performance and reliability of communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of tune away occasion suspension for multi-subscriber identity module operation as described herein, or the processor 840 and the memory 830 may be otherwise configured to perform or support such operations.

Figure 9:
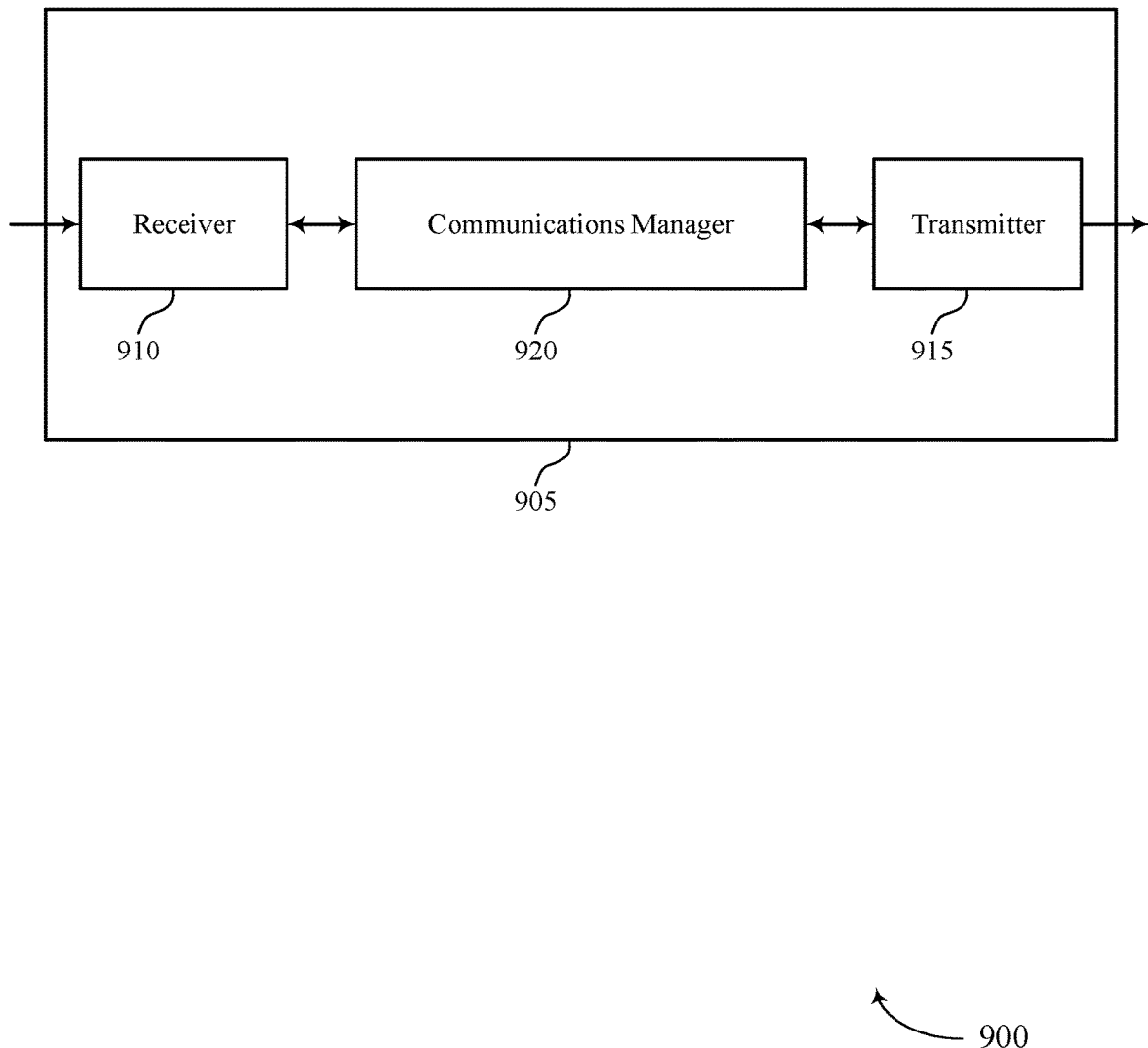
FIGS. 9 and 10 show block diagrams of devices that support tune away occasion suspension for multi-subscriber identity module operation in accordance with aspects of the present disclosure.

FIG. 9 shows a block diagram 900 of a device 905 that supports tune away occasion suspension for multi-subscriber identity module operation in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to tune away occasion suspension for multi-subscriber identity module operation). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to tune away occasion suspension for multi-subscriber identity module operation). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of tune away occasion suspension for multi-subscriber identity module operation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE associated with a first subscription, first control signaling indicating a configuration for a set of multiple tune away occasions in which the UE is to monitor for paging signaling associated with a second subscription of the UE. The communications manager 920 may be configured as or otherwise support a means for receiving, from the UE, second control signaling indicating a suspension of a tune away occasion of the set of multiple tune away occasions based on the configuration. The communications manager 920 may be configured as or otherwise support a means for communicating data with the UE associated with the first subscription in the suspended tune away occasion based on receiving the second control signaling.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for suspending one or multiple tune away occasions, which may enable a UE to use a first subscription instead of tuning away to a second subscription during a tune away occasion. As such, the described techniques may increase resource efficiency and enhance the performance and reliability of communications.

Figure 10:
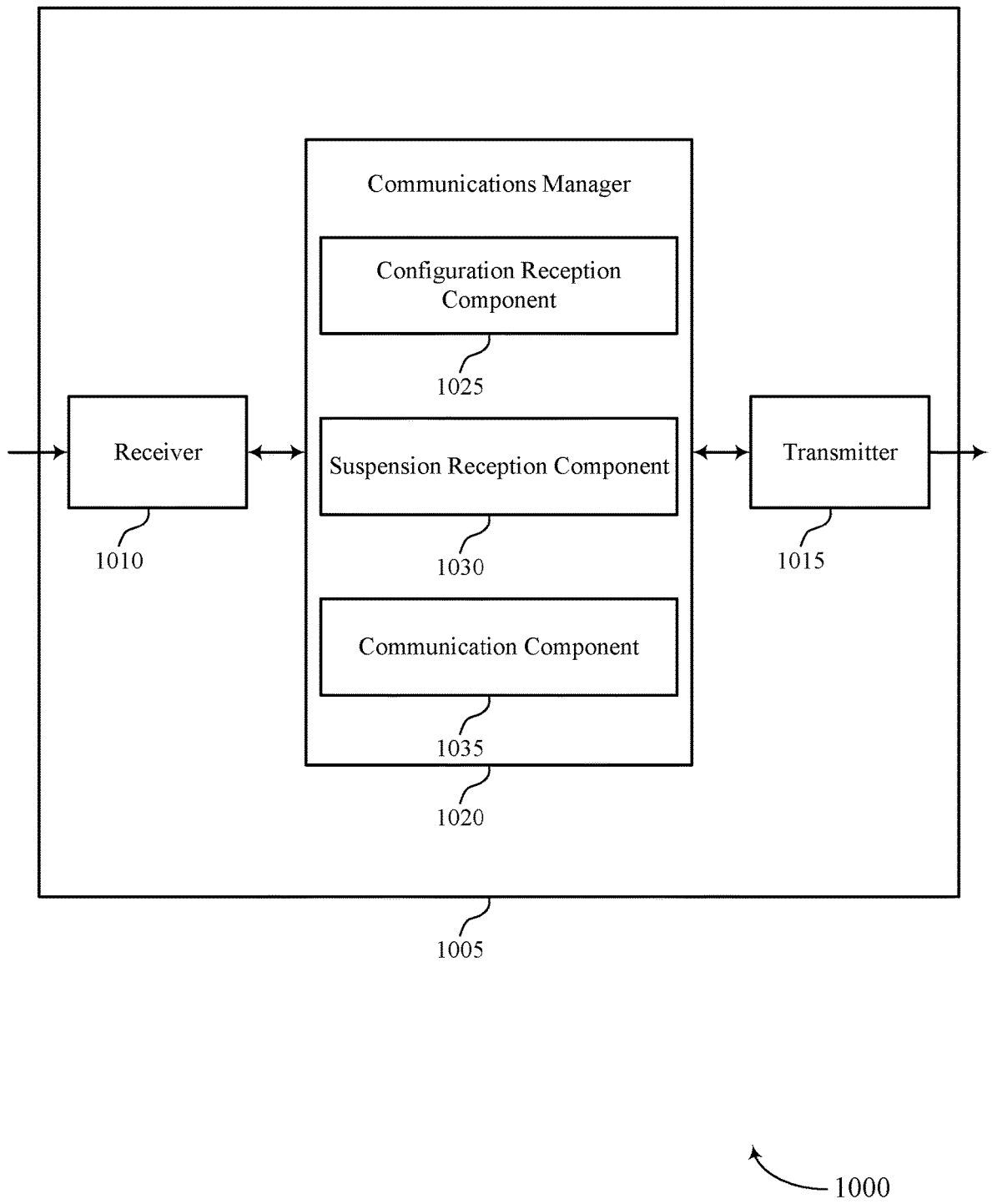

FIG. 10 shows a block diagram 1000 of a device 1005 that supports tune away occasion suspension for multi-subscriber identity module operation in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to tune away occasion suspension for multi-subscriber identity module operation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to tune away occasion suspension for multi-subscriber identity module operation). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of tune away occasion suspension for multi-subscriber identity module operation as described herein. For example, the communications manager 1020 may include a configuration reception component 1025, a suspension reception component 1030, a communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The configuration reception component 1025 may be configured as or otherwise support a means for receiving, from a UE associated with a first subscription, first control signaling indicating a configuration for a set of multiple tune away occasions in which the UE is to monitor for paging signaling associated with a second subscription of the UE. The suspension reception component 1030 may be configured as or otherwise support a means for receiving, from the UE, second control signaling indicating a suspension of a tune away occasion of the set of multiple tune away occasions based on the configuration. The communication component 1035 may be configured as or otherwise support a means for communicating data with the UE associated with the first subscription in the suspended tune away occasion based on receiving the second control signaling.

Figure 11:
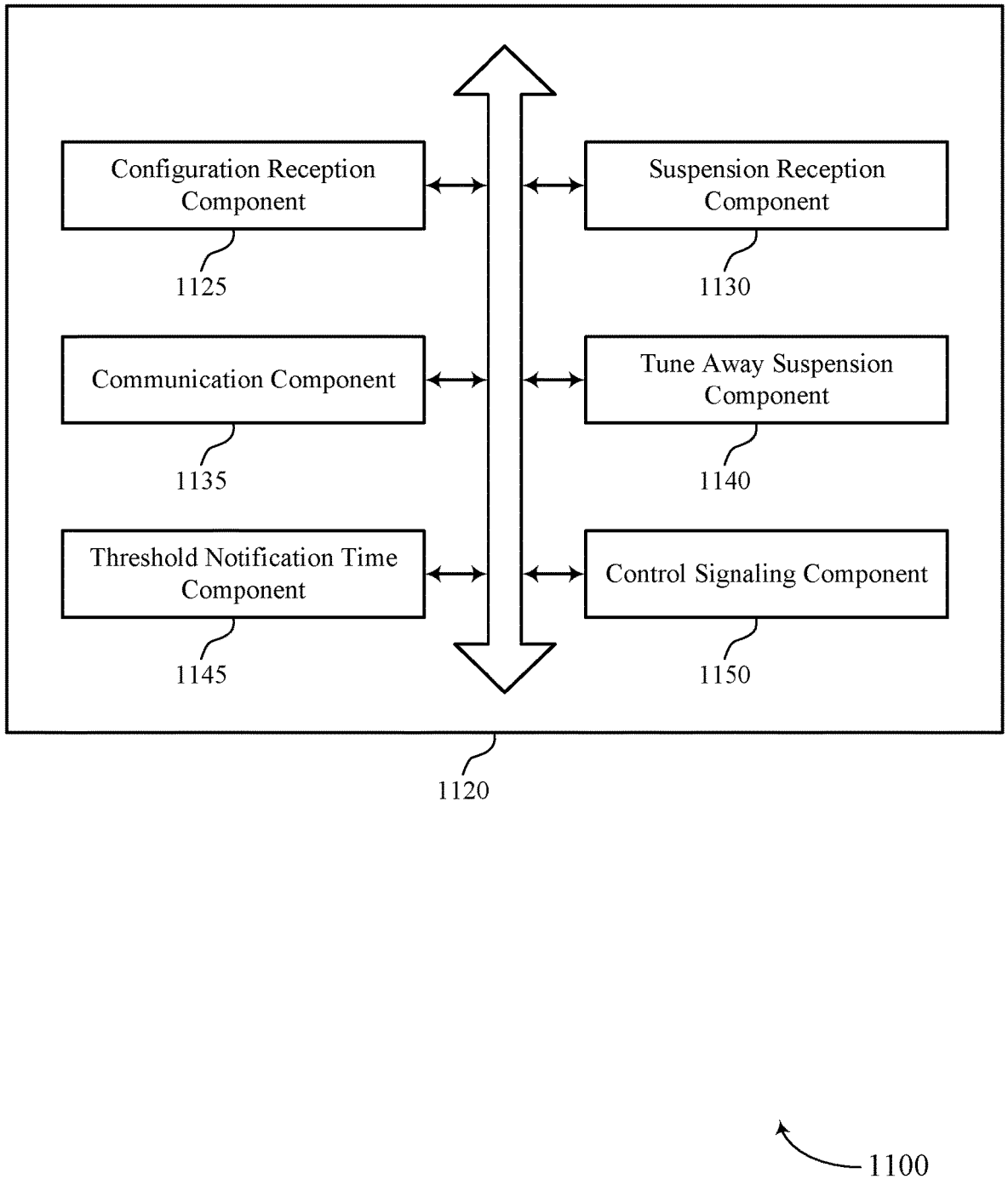
FIG. 11 shows a block diagram of a communications manager that supports tune away occasion suspension for multi-subscriber identity module operation in accordance with aspects of the present disclosure.

FIG. 11 shows a block diagram 1100 of a communications manager 1120 that supports tune away occasion suspension for multi-subscriber identity module operation in accordance with aspects of the present disclosure. The communications manager 1120 may be an example of aspects of a communications manager 920, a communications manager 1020, or both, as described herein. The communications manager 1120, or various components thereof, may be an example of means for performing various aspects of tune away occasion suspension for multi-subscriber identity module operation as described herein. For example, the communications manager 1120 may include a configuration reception component 1125, a suspension reception component 1130, a communication component 1135, a tune away suspension component 1140, a threshold notification time component 1145, a control signaling component 1150, or any combination thereof. Each of these components may communicate, directly or indirectly, with one another (e.g., via one or more buses).

The communications manager 1120 may support wireless communications at a base station in accordance with examples as disclosed herein. The configuration reception component 1125 may be configured as or otherwise support a means for receiving, from a UE associated with a first subscription, first control signaling indicating a configuration for a set of multiple tune away occasions in which the UE is to monitor for paging signaling associated with a second subscription of the UE. The suspension reception component 1130 may be configured as or otherwise support a means for receiving, from the UE, second control signaling indicating a suspension of a tune away occasion of the set of multiple tune away occasions based on the configuration. The communication component 1135 may be configured as or otherwise support a means for communicating data with the UE associated with the first subscription in the suspended tune away occasion based on receiving the second control signaling.

In some examples, to support receiving the second control signaling, the tune away suspension component 1140 may be configured as or otherwise support a means for receiving the second control signaling indicating the suspension of a subset of multiple tune away occasions of the set of multiple tune away occasions based on the configuration.

In some examples, to support receiving the second control signaling, the tune away suspension component 1140 may be configured as or otherwise support a means for receiving the second control signaling indicating an offset for the suspension, where the subset of multiple tune away occasions are suspended after the offset following receiving the second control signaling.

In some examples, the second control signaling includes a field indicating a quantity of suspended tune away occasions for the subset of multiple tune away occasions, a set of multiple indices corresponding to the suspended tune away occasions of the subset of multiple tune away occasions, or both.

In some examples, to support receiving the second control signaling, the tune away suspension component 1140 may be configured as or otherwise support a means for receiving the second control signaling including a bit, where a value of the bit indicates the suspension of a next tune away occasion of the set of multiple tune away occasions.

In some examples, the threshold notification time component 1145 may be configured as or otherwise support a means for transmitting, to the UE, third control signaling configuring a threshold notification time, where the second control signaling is received based on the threshold notification time, a start of the suspended tune away occasion, an end of the suspended tune away occasion, or a combination thereof. In some examples, the second control signaling includes a MAC-CE. In some examples, the second control signaling includes L1 signaling.

In some examples, the communication component 1135 may be configured as or otherwise support a means for refraining from communicating data with the UE associated with the first subscription in a first tune away occasion of the set of multiple tune away occasions based on the configuration.

Figure 12:
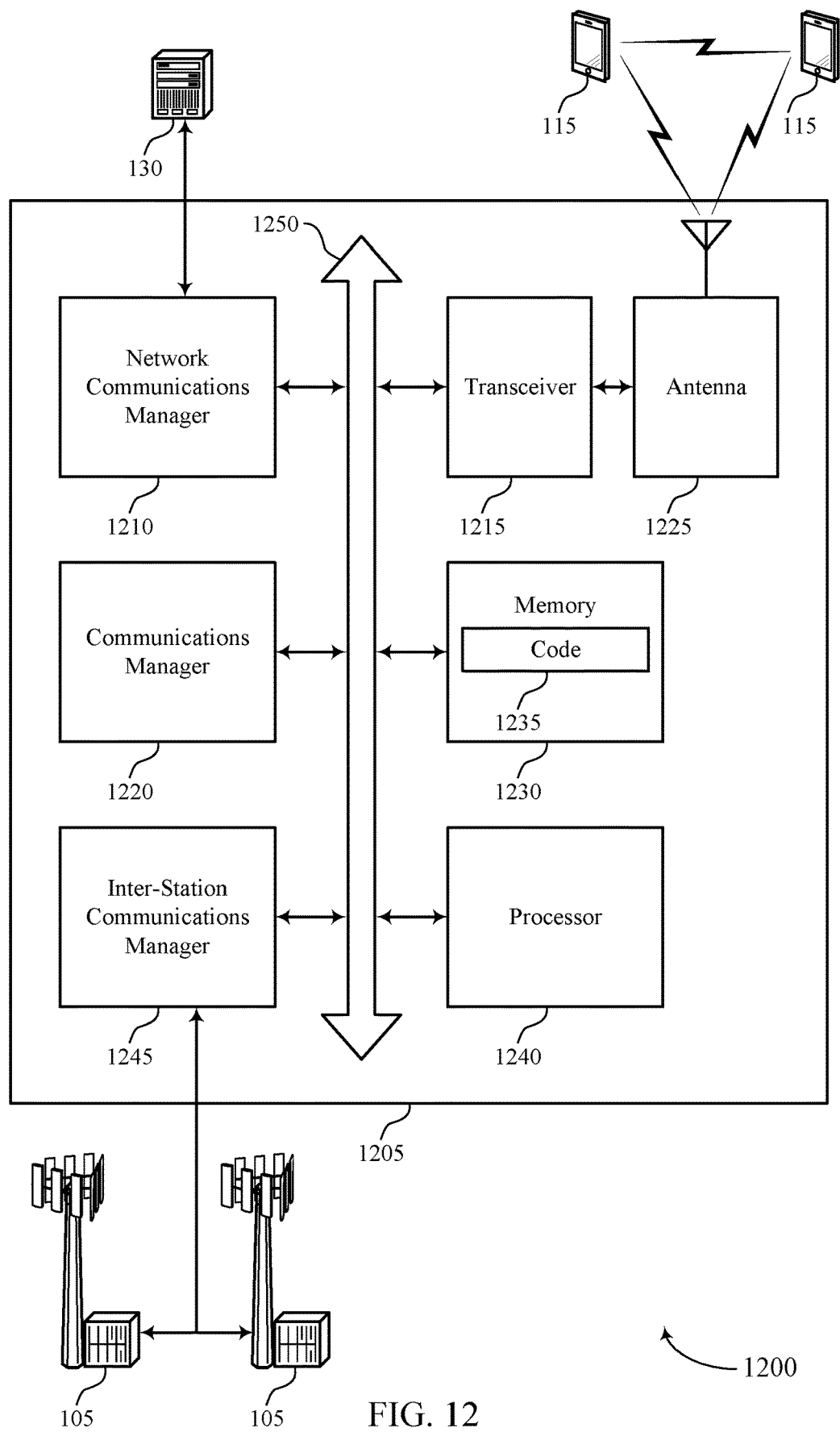
FIG. 12 shows a diagram of a system including a device that supports tune away occasion suspension for multi-subscriber identity module operation in accordance with aspects of the present disclosure.

FIG. 12 shows a diagram of a system 1200 including a device 1205 that supports tune away occasion suspension for multi-subscriber identity module operation in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting tune away occasion suspension for multi-subscriber identity module operation). For example, the device 1205 or a component of the device 1205 may include a processor 1240 and memory 1230 coupled with the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE associated with a first subscription, first control signaling indicating a configuration for a set of multiple tune away occasions in which the UE is to monitor for paging signaling associated with a second subscription of the UE. The communications manager 1220 may be configured as or otherwise support a means for receiving, from the UE, second control signaling indicating a suspension of a tune away occasion of the set of multiple tune away occasions based on the configuration. The communications manager 1220 may be configured as or otherwise support a means for communicating data with the UE associated with the first subscription in the suspended tune away occasion based on receiving the second control signaling.

By including or configuring the communications manager 1220 in accordance with examples as described herein, the device 1205 may support techniques for suspending one or multiple tune away occasions, which may enable a UE to use a first subscription instead of tuning away to a second subscription during a tune away occasion. As such, the described techniques may increase resource efficiency and enhance the performance and reliability of communications.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of tune away occasion suspension for multi-subscriber identity module operation as described herein, or the processor 1240 and the memory 1230 may be otherwise configured to perform or support such operations.

Figure 13:
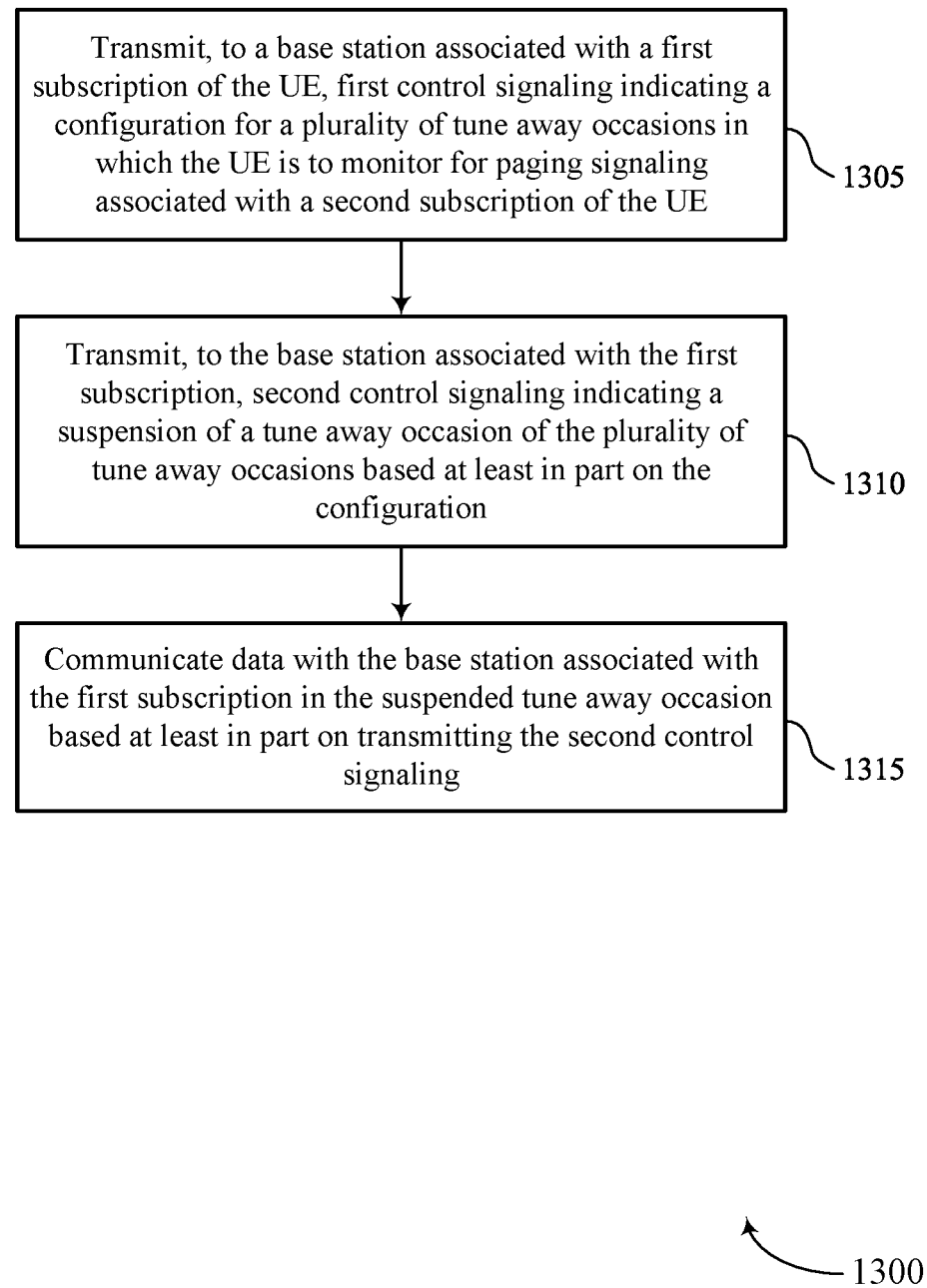
FIGS. 13 through 17 show flowcharts illustrating methods that support tune away occasion suspension for multi-subscriber identity module operation in accordance with aspects of the present disclosure.

FIG. 13 shows a flowchart illustrating a method 1300 that supports tune away occasion suspension for multi-subscriber identity module operation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station associated with a first subscription of the UE, first control signaling indicating a configuration for a set of multiple tune away occasions in which the UE is to monitor for paging signaling associated with a second subscription of the UE. The operations of 1305 may be performed in accordance with examples as disclosed herein. In some examples, aspects of the operations of 1305 may be performed by a configuration transmission component 725 as described with reference to FIG. 7.

At 1310, the method may include transmitting, to the base station associated with the first subscription, second control signaling indicating a suspension of a tune away occasion of the set of multiple tune away occasions based on the configuration. The operations of 1310 may be performed in accordance with examples as disclosed herein. In some examples, aspects of the operations of 1310 may be performed by a suspension transmission component 730 as described with reference to FIG. 7.

At 1315, the method may include communicating data with the base station associated with the first subscription in the suspended tune away occasion based on transmitting the second control signaling. The operations of 1315 may be performed in accordance with examples as disclosed herein. In some examples, aspects of the operations of 1315 may be performed by a data communication component 735 as described with reference to FIG. 7.

Figure 14:
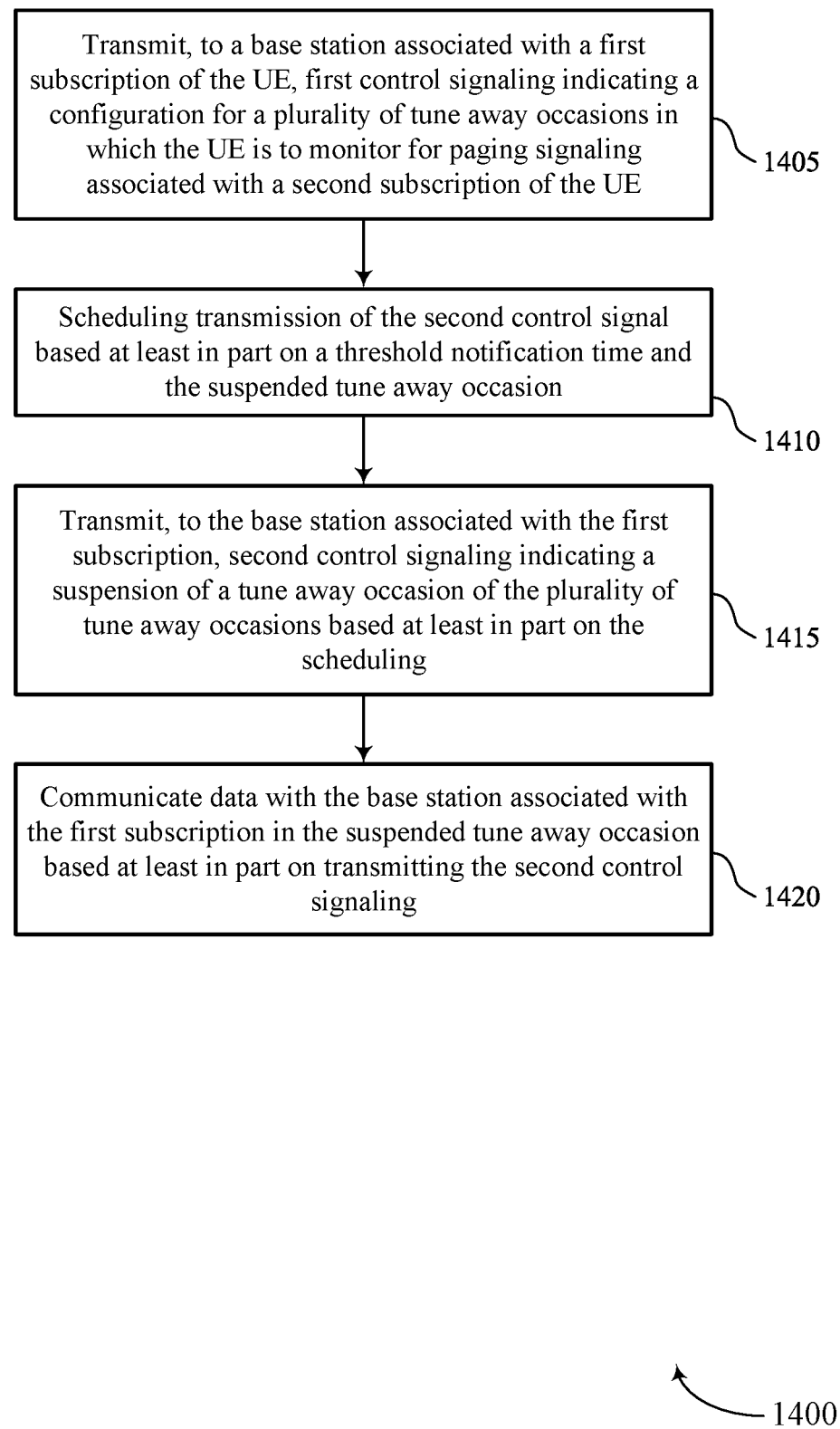

FIG. 14 shows a flowchart illustrating a method 1400 that supports tune away occasion suspension for multi-subscriber identity module operation in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station associated with a first subscription of the UE, first control signaling indicating a configuration for a set of multiple tune away occasions in which the UE is to monitor for paging signaling associated with a second subscription of the UE. The operations of 1405 may be performed in accordance with examples as disclosed herein. In some examples, aspects of the operations of 1405 may be performed by a configuration transmission component 725 as described with reference to FIG. 7.

At 1410, the method may include scheduling transmission of the second control signaling based on a threshold notification time and the suspended tune away occasion. The operations of 1410 may be performed in accordance with examples as disclosed herein. In some examples, aspects of the operations of 1410 may be performed by a scheduling component 740 as described with reference to FIG. 7.

At 1415, the method may include transmitting, to the base station associated with the first subscription, second control signaling indicating a suspension of a tune away occasion of the set of multiple tune away occasions based on the scheduling. The operations of 1415 may be performed in accordance with examples as disclosed herein. In some examples, aspects of the operations of 1415 may be performed by a suspension transmission component 730 as described with reference to FIG. 7.

At 1420, the method may include communicating data with the base station associated with the first subscription in the suspended tune away occasion based on transmitting the second control signaling. The operations of 1420 may be performed in accordance with examples as disclosed herein. In some examples, aspects of the operations of 1420 may be performed by a data communication component 735 as described with reference to FIG. 7.

Figure 15:
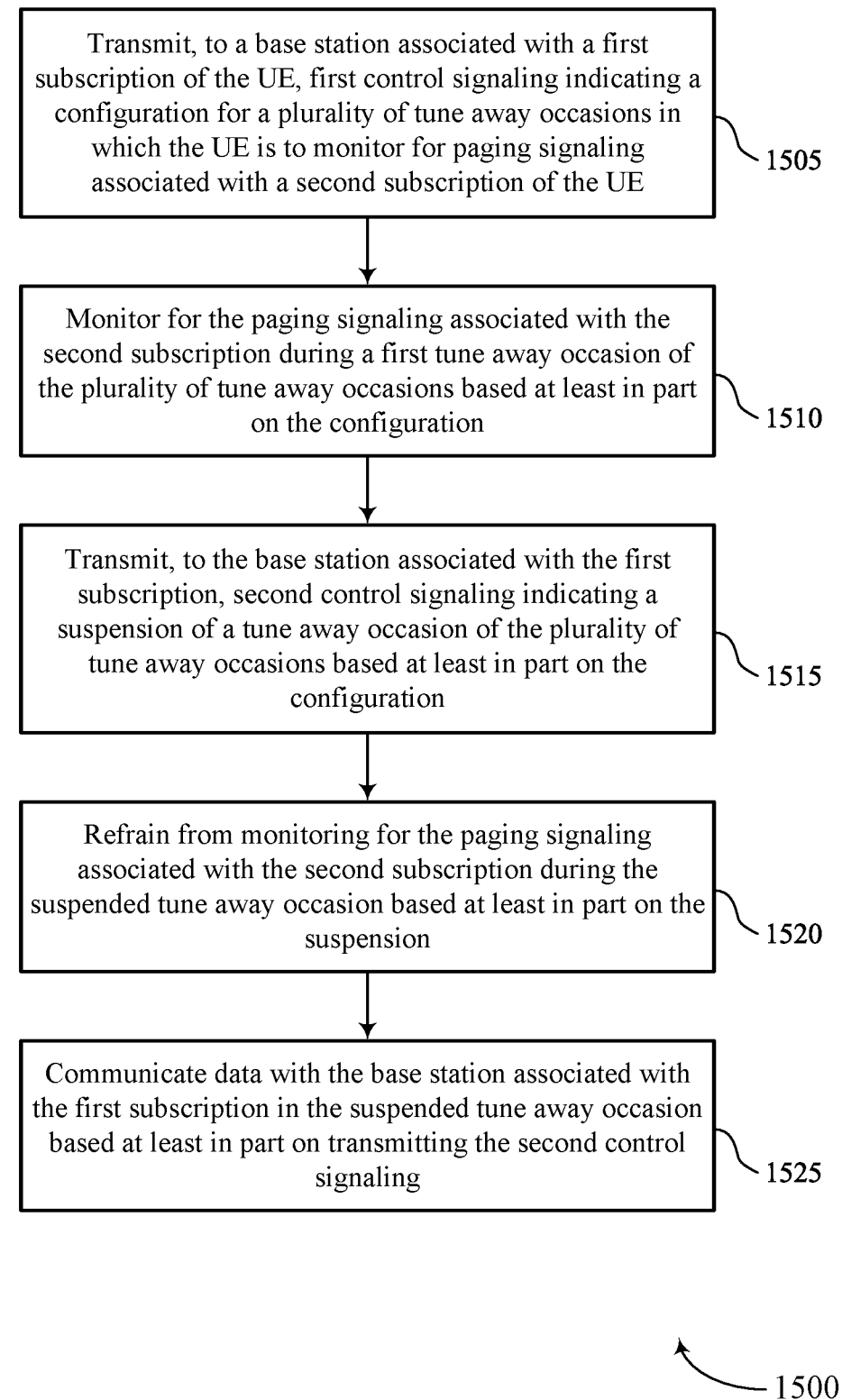

FIG. 15 shows a flowchart illustrating a method 1500 that supports tune away occasion suspension for multi-subscriber identity module operation in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station associated with a first subscription of the UE, first control signaling indicating a configuration for a set of multiple tune away occasions in which the UE is to monitor for paging signaling associated with a second subscription of the UE. The operations of 1505 may be performed in accordance with examples as disclosed herein. In some examples, aspects of the operations of 1505 may be performed by a configuration transmission component 725 as described with reference to FIG. 7.

At 1510, the method may include monitoring for the paging signaling associated with the second subscription during a first tune away occasion of the set of multiple tune away occasions based on the configuration. The operations of 1510 may be performed in accordance with examples as disclosed herein. In some examples, aspects of the operations of 1510 may be performed by a paging monitoring component 755 as described with reference to FIG. 7.

At 1515, the method may include transmitting, to the base station associated with the first subscription, second control signaling indicating a suspension of a tune away occasion of the set of multiple tune away occasions based on the configuration. The operations of 1515 may be performed in accordance with examples as disclosed herein. In some examples, aspects of the operations of 1515 may be performed by a suspension transmission component 730 as described with reference to FIG. 7.

At 1520, the method may include refraining from monitoring for the paging signaling associated with the second subscription during the suspended tune away occasion based on the suspension. The operations of 1520 may be performed in accordance with examples as disclosed herein. In some examples, aspects of the operations of 1520 may be performed by a paging monitoring component 755 as described with reference to FIG. 7.

At 1525, the method may include communicating data with the base station associated with the first subscription in the suspended tune away occasion based on transmitting the second control signaling. The operations of 1525 may be performed in accordance with examples as disclosed herein. In some examples, aspects of the operations of 1525 may be performed by a data communication component 735 as described with reference to FIG. 7.

Figure 16:
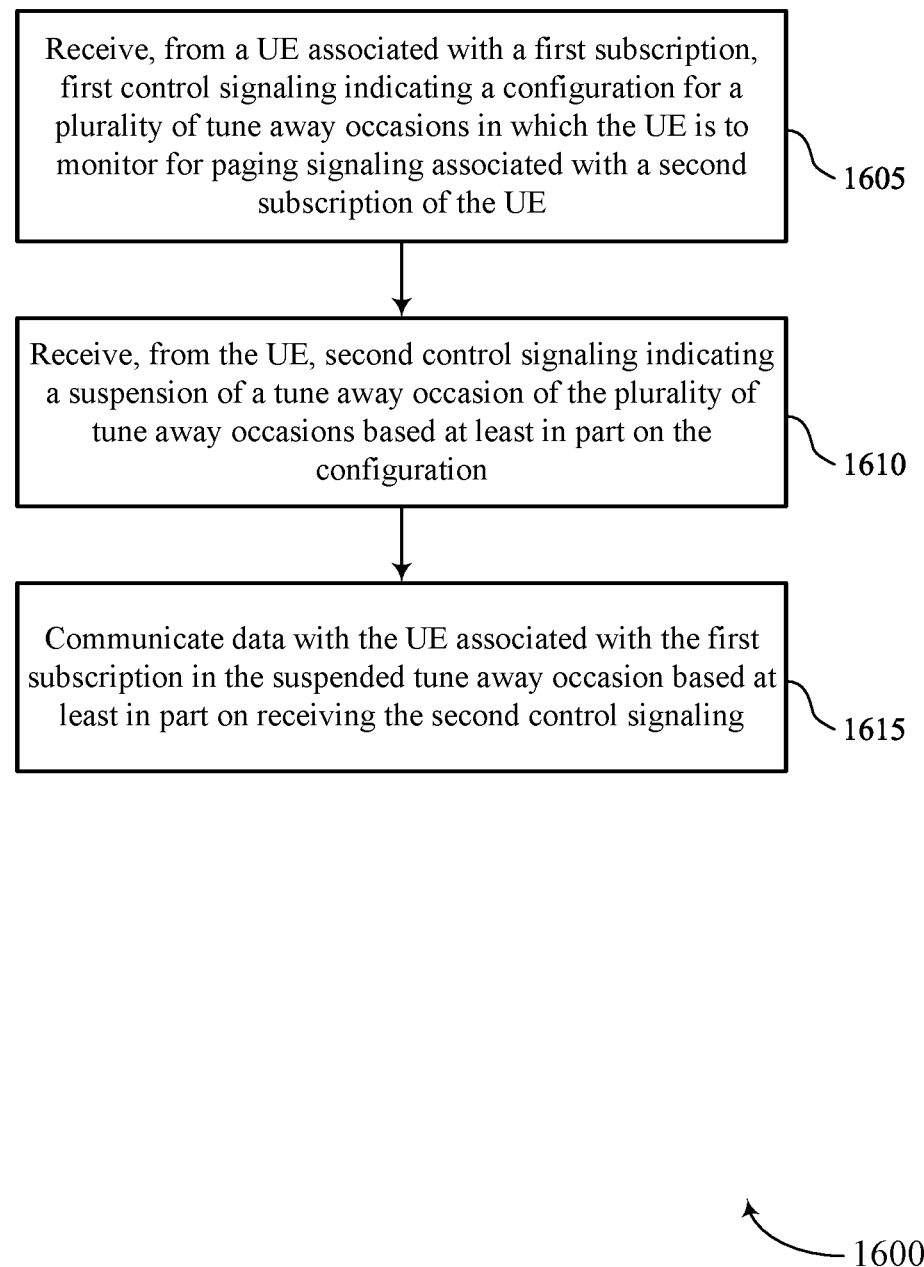

FIG. 16 shows a flowchart illustrating a method 1600 that supports tune away occasion suspension for multi-subscriber identity module operation in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a UE associated with a first subscription, first control signaling indicating a configuration for a set of multiple tune away occasions in which the UE is to monitor for paging signaling associated with a second subscription of the UE. The operations of 1605 may be performed in accordance with examples as disclosed herein. In some examples, aspects of the operations of 1605 may be performed by a configuration reception component 1125 as described with reference to FIG. 11.

At 1610, the method may include receiving, from the UE, second control signaling indicating a suspension of a tune away occasion of the set of multiple tune away occasions based on the configuration. The operations of 1610 may be performed in accordance with examples as disclosed herein. In some examples, aspects of the operations of 1610 may be performed by a suspension reception component 1130 as described with reference to FIG. 11.

At 1615, the method may include communicating data with the UE associated with the first subscription in the suspended tune away occasion based on receiving the second control signaling. The operations of 1615 may be performed in accordance with examples as disclosed herein. In some examples, aspects of the operations of 1615 may be performed by a communication component 1135 as described with reference to FIG. 11.

Figure 17:
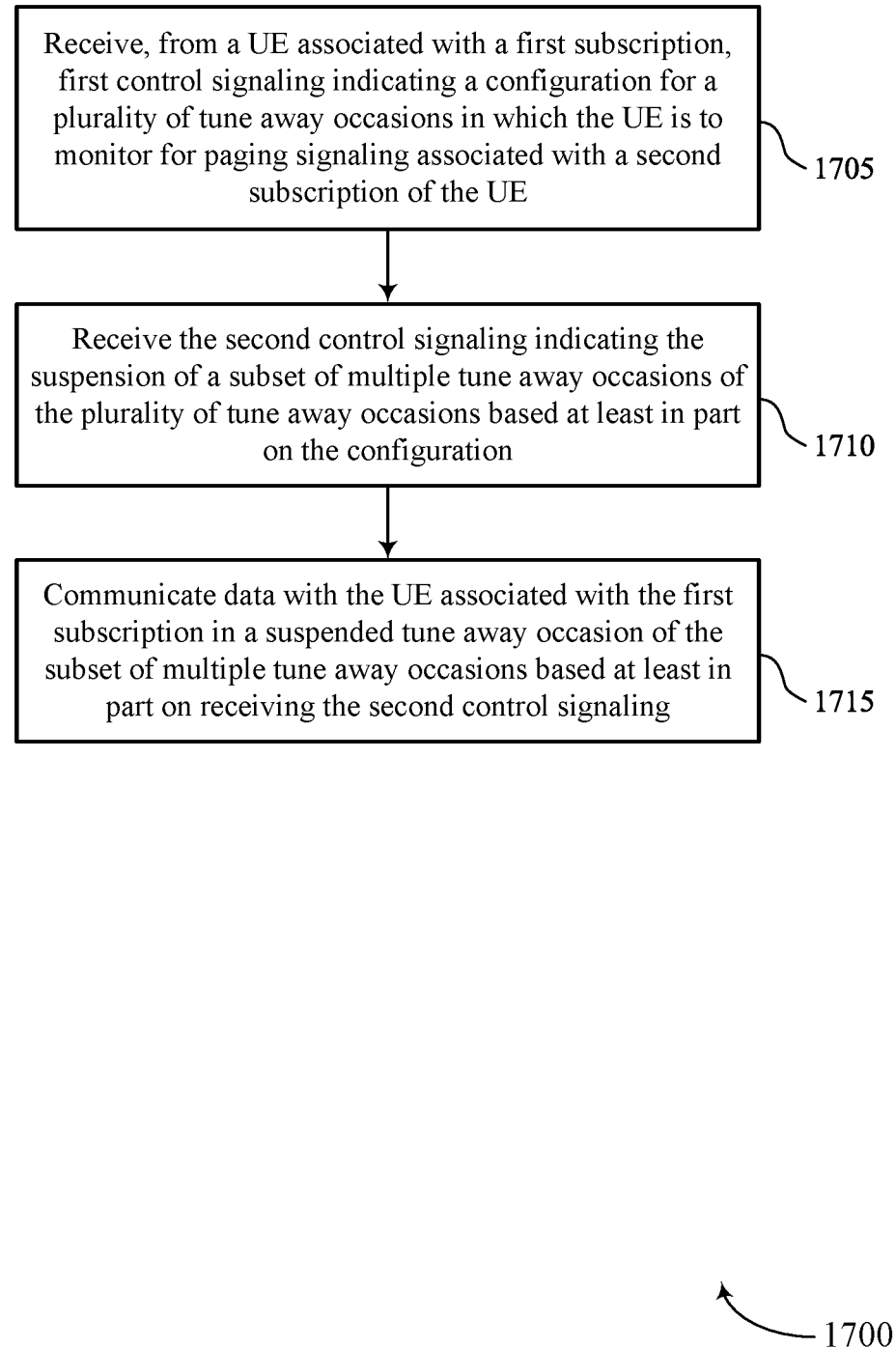

FIG. 17 shows a flowchart illustrating a method 1700 that supports tune away occasion suspension for multi-subscriber identity module operation in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include receiving, from a UE associated with a first subscription, first control signaling indicating a configuration for a set of multiple tune away occasions in which the UE is to monitor for paging signaling associated with a second subscription of the UE. The operations of 1705 may be performed in accordance with examples as disclosed herein. In some examples, aspects of the operations of 1705 may be performed by a configuration reception component 1125 as described with reference to FIG. 11.

At 1710, the method may include receiving the second control signaling indicating the suspension of a subset of multiple tune away occasions of the set of multiple tune away occasions based on the configuration. The operations of 1710 may be performed in accordance with examples as disclosed herein. In some examples, aspects of the operations of 1710 may be performed by a tune away suspension component 1140 as described with reference to FIG. 11.

At 1715, the method may include communicating data with the UE associated with the first subscription in a suspended tune away occasion of the subset of multiple tune away occasions based on receiving the second control signaling. The operations of 1715 may be performed in accordance with examples as disclosed herein. In some examples, aspects of the operations of 1715 may be performed by a communication component 1135 as described with reference to FIG. 11.

The following provides an overview of aspects of the present disclosure:

Aspect 1: A method for wireless communications at a UE, comprising: transmitting, to a base station associated with a first subscription of the UE, first control signaling indicating a configuration for a plurality of tune away occasions in which the UE is to monitor for paging signaling associated with a second subscription of the UE; transmitting, to the base station associated with the first subscription, second control signaling indicating a suspension of a tune away occasion of the plurality of tune away occasions based at least in part on the configuration; and communicating data with the base station associated with the first subscription in the suspended tune away occasion based at least in part on transmitting the second control signaling.

Aspect 2: The method of aspect 1, wherein transmitting the second control signaling comprises: transmitting the second control signaling indicating the suspension of a subset of multiple tune away occasions of the plurality of tune away occasions based at least in part on the configuration.

Aspect 3: The method of aspect 2, wherein the subset of multiple tune away occasions are consecutive in time within the plurality of tune away occasions.

Aspect 4: The method of any of aspects 2 through 3, wherein transmitting the second control signaling comprises: transmitting the second control signaling indicating an offset for the suspension, wherein the subset of multiple tune away occasions are suspended after the offset following transmitting the second control signaling.

Aspect 5: The method of aspect 4, wherein the offset comprises a quantity of tune away occasions, a threshold time, or both.

Aspect 6: The method of any of aspects 2 through 5, wherein the second control signaling comprises a field indicating a quantity of suspended tune away occasions for the subset of multiple tune away occasions, a plurality of indices corresponding to the suspended tune away occasions of the subset of multiple tune away occasions, or both.

Aspect 7: The method of aspect 1, wherein transmitting the second control signaling comprises: transmitting the second control signaling comprising a bit, wherein a value of the bit indicates the suspension of a next tune away occasion of the plurality of tune away occasions.

Aspect 8: The method of any of aspects 1 through 7, further comprising: scheduling transmission of the second control signaling based at least in part on a threshold notification time and the suspended tune away occasion, wherein the second control signaling is transmitted based at least in part on the scheduling.

Aspect 9: The method of aspect 8, further comprising: receiving, from the base station, third control signaling configuring the threshold notification time, wherein the scheduling is based at least in part on the third control signaling.

Aspect 10: The method of any of aspects 8 through 9, wherein scheduling the transmission comprises: scheduling the transmission of the second control signaling in advance of a start of the suspended tune away occasion, an end of the suspended tune away occasion, or both according to the threshold notification time.

Aspect 11: The method of any of aspects 1 through 10, wherein transmitting the second control signaling comprises: transmitting a MAC-CE indicating the suspension of the tune away occasion of the plurality of tune away occasions.

Aspect 12: The method of any of aspects 1 through 10, wherein transmitting the second control signaling comprises: transmitting L1 signaling indicating the suspension of the tune away occasion of the plurality of tune away occasions.

Aspect 13: The method of any of aspects 1 through 12, wherein transmitting the first control signaling comprises: transmitting RRC signaling indicating the configuration for the plurality of tune away occasions.

Aspect 14: The method of any of aspects 1 through 13, wherein the configuration for the plurality of tune away occasions defines a periodicity of the plurality of tune away occasions, a duration for each tune away occasion of the plurality of tune away occasions, or both.

Aspect 15: The method of any of aspects 1 through 14, further comprising: monitoring for the paging signaling associated with the second subscription during a first tune away occasion of the plurality of tune away occasions based at least in part on the configuration; and refraining from monitoring for the paging signaling associated with the second subscription during the suspended tune away occasion based at least in part on the suspension.

Aspect 16: The method of any of aspects 1 through 15, wherein the first subscription of the UE corresponds to a first universal subscriber identity module in a connected mode and the second subscription of the UE corresponds to a second universal subscriber identity module in an idle mode.

Aspect 17: The method of any of aspects 1 through 16, wherein the first subscription of the UE corresponds to a DDS and the second subscription of the UE corresponds to an nDDS.

Aspect 18: A method for wireless communications at a base station, comprising: receiving, from a UE associated with a first subscription, first control signaling indicating a configuration for a plurality of tune away occasions in which the UE is to monitor for paging signaling associated with a second subscription of the UE; receiving, from the UE, second control signaling indicating a suspension of a tune away occasion of the plurality of tune away occasions based at least in part on the configuration; and communicating data with the UE associated with the first subscription in the suspended tune away occasion based at least in part on receiving the second control signaling.

Aspect 19: The method of aspect 18, wherein receiving the second control signaling comprises: receiving the second control signaling indicating the suspension of a subset of multiple tune away occasions of the plurality of tune away occasions based at least in part on the configuration.

Aspect 20: The method of aspect 19, wherein receiving the second control signaling comprises: receiving the second control signaling indicating an offset for the suspension, wherein the subset of multiple tune away occasions are suspended after the offset following receiving the second control signaling.

Aspect 21: The method of any of aspects 19 through 20, wherein the second control signaling comprises a field indicating a quantity of suspended tune away occasions for the subset of multiple tune away occasions, a plurality of indices corresponding to the suspended tune away occasions of the subset of multiple tune away occasions, or both.

Aspect 22: The method of aspect 18, wherein receiving the second control signaling comprises: receiving the second control signaling comprising a bit, wherein a value of the bit indicates the suspension of a next tune away occasion of the plurality of tune away occasions.

Aspect 23: The method of any of aspects 18 through 22, further comprising: transmitting, to the UE, third control signaling configuring a threshold notification time, wherein the second control signaling is received based at least in part on the threshold notification time, a start of the suspended tune away occasion, an end of the suspended tune away occasion, or a combination thereof.

Aspect 24: The method of any of aspects 18 through 23, wherein the second control signaling comprises a MAC-CE.

Aspect 25: The method of any of aspects 18 through 23, wherein the second control signaling comprises L1 signaling.

Aspect 26: The method of any of aspects 18 through 25, further comprising: refraining from communicating data with the UE associated with the first subscription in a first tune away occasion of the plurality of tune away occasions based at least in part on the configuration.

Aspect 27: An apparatus for wireless communications at a UE, comprising a processor; memory coupled with the processor; and instructions stored in the memory and executable by the processor to cause the apparatus to perform a method of any of aspects 1 through 17.

Aspect 28: An apparatus for wireless communications at a UE, comprising at least one means for performing a method of any of aspects 1 through 17.

Aspect 29: A non-transitory computer-readable medium storing code for wireless communications at a UE, the code comprising instructions executable by a processor to perform a method of any of aspects 1 through 17.

Aspect 30: An apparatus for wireless communications at a base station, comprising a processor; memory coupled with the processor; and instructions stored in the memory and executable by the processor to cause the apparatus to perform a method of any of aspects 18 through 26.

Aspect 31: An apparatus for wireless communications at a base station, comprising at least one means for performing a method of any of aspects 18 through 26.

Aspect 32: A non-transitory computer-readable medium storing code for wireless communications at a base station, the code comprising instructions executable by a processor to perform a method of any of aspects 18 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting, to a first base station associated with a first subscription of the UE, first control signaling indicating a configuration for a plurality of tune away occasions;
   monitoring for paging signaling from a second base station associated with a second subscription of the UE during a first tune away occasion of the plurality of tune away occasions;
   transmitting, to the first base station associated with the first subscription, second control signaling indicating tune away occasion suspension and a quantity of tune away occasions of the plurality of tune away occasions based at least in part on the configuration;
   suspending multiple tune away occasions based at least in part on the second control signaling, wherein a quantity of the multiple suspended tune away occasions is the quantity of tune away occasions indicated by the second control signaling; and
   communicating data with the first base station associated with the first subscription during at least a portion of the multiple suspended tune away occasions.

2. The method of claim 1, wherein transmitting the second control signaling comprises:
   transmitting the second control signaling indicating suspension of a subset of the plurality of tune away occasions based at least in part on the configuration, wherein the subset of the plurality of tune away occasions comprises the multiple suspended tune away occasions.

3. The method of claim 2, wherein the subset of the plurality of tune away occasions are consecutive in time within the plurality of tune away occasions.

4. The method of claim 2, wherein transmitting the second control signaling comprises:
   transmitting the second control signaling indicating an offset for the suspension, wherein the subset of the plurality of tune away occasions are suspended after the offset following transmitting the second control signaling.

5. The method of claim 4, wherein the offset comprises a first quantity of tune away occasions, a threshold time, or both.

6. The method of claim 1, wherein the second control signaling comprises a field indicating the quantity of tune away occasions, a plurality of indices corresponding to the multiple suspended tune away occasions, or both.

7. The method of claim 1, wherein transmitting the second control signaling comprises:
   transmitting the second control signaling comprising a bit, wherein a value of the bit indicates suspension of a next tune away occasion of the plurality of tune away occasions.

8. The method of claim 1, further comprising:
   scheduling transmission of the second control signaling based at least in part on a threshold notification time and the multiple suspended tune away occasions, wherein the second control signaling is transmitted based at least in part on the scheduling.

9. The method of claim 8, further comprising:
   receiving third control signaling configuring the threshold notification time, wherein the scheduling is based at least in part on the third control signaling.

10. The method of claim 8, wherein scheduling the transmission comprises:
    scheduling the transmission of the second control signaling in advance of a start of the multiple suspended tune away occasions, an end of the multiple suspended tune away occasions, or both according to the threshold notification time.

11. The method of claim 1, wherein transmitting the second control signaling comprises:
    transmitting a medium access control control element indicating suspension of the multiple tune away occasions of the plurality of tune away occasions.

12. The method of claim 1, wherein transmitting the second control signaling comprises:
    transmitting layer 1 signaling indicating suspension of the multiple tune away occasions of the plurality of tune away occasions.

13. The method of claim 1, wherein transmitting the first control signaling comprises:
    transmitting radio resource control signaling indicating the configuration for the plurality of tune away occasions.

14. The method of claim 1, wherein the configuration for the plurality of tune away occasions defines a periodicity of the plurality of tune away occasions, a duration for each tune away occasion of the plurality of tune away occasions, or both.

15. The method of claim 1, further comprising:
    refraining from monitoring for the paging signaling associated with the second subscription during the multiple suspended tune away occasions based at least in part on the second control signaling.

16. The method of claim 1, wherein the first subscription of the UE corresponds to a first universal subscriber identity module in a connected mode and the second subscription of the UE corresponds to a second universal subscriber identity module in an idle mode.

17. The method of claim 1, wherein the first subscription of the UE corresponds to a dedicated data subscription and the second subscription of the UE corresponds to a non-dedicated data subscription.

18. An apparatus for wireless communications at a user equipment (UE), comprising:
a processor;
memory coupled with the processor; and
instructions stored in the memory and executable by the processor to cause the apparatus to:
transmit, to a first base station associated with a first subscription of the UE, first control signaling indicating a configuration for a plurality of tune away occasions;
monitor for paging signaling from a second base station associated with a second subscription of the UE during a first tune away occasion of the plurality of tune away occasions;
transmit, to the first base station associated with the first subscription, second control signaling indicating tune away occasion suspension and a quantity of tune away occasions of the plurality of tune away occasions based at least in part on the configuration;
suspend multiple tune away occasions based at least in part on the second control signaling, wherein a quantity of the multiple suspended tune away occasions is the quantity of tune away occasions indicated by the second control signaling; and
communicate data with the first base station associated with the first subscription during at least a portion of the multiple suspended tune away occasions.

19. The apparatus of claim 18, wherein the instructions to transmit the second control signaling are executable by the processor to cause the apparatus to:
transmit the second control signaling indicating suspension of a subset of the plurality of tune away occasions based at least in part on the configuration, wherein the subset of the plurality of tune away occasions comprises the multiple suspended tune away occasions.

20. The apparatus of claim 19, wherein the subset of the plurality of tune away occasions are consecutive in time within the plurality of tune away occasions.

21. The apparatus of claim 19, wherein the instructions to transmit the second control signaling are executable by the processor to cause the apparatus to:
transmit the second control signaling indicating an offset for the suspension, wherein the subset of the plurality of tune away occasions are suspended after the offset following transmitting the second control signaling.

22. The apparatus of claim 21, wherein the offset comprises a first quantity of tune away occasions, a threshold time, or both.

23. The apparatus of claim 18, wherein the second control signaling comprises a field indicating the quantity of tune away occasions, a plurality of indices corresponding to the multiple suspended tune away occasions, or both.

24. The apparatus of claim 18, wherein the instructions to transmit the second control signaling are executable by the processor to cause the apparatus to:
transmit the second control signaling comprising a bit, wherein a value of the bit indicates suspension of a next tune away occasion of the plurality of tune away occasions.

25. The apparatus of claim 18, wherein the instructions are further executable by the processor to cause the apparatus to:
schedule transmission of the second control signaling based at least in part on a threshold notification time and the multiple suspended tune away occasions, wherein the second control signaling is transmitted based at least in part on the scheduling.

26. The apparatus of claim 25, wherein the instructions are further executable by the processor to cause the apparatus to:
receive third control signaling configuring the threshold notification time, wherein the scheduling is based at least in part on the third control signaling.

27. The apparatus of claim 25, wherein the instructions to schedule the transmission are executable by the processor to cause the apparatus to:
schedule the transmission of the second control signaling in advance of a start of the multiple suspended tune away occasions, an end of the multiple suspended tune away occasions, or both according to the threshold notification time.

28. The apparatus of claim 18, wherein the instructions are further executable by the processor to cause the apparatus to:
refrain from monitoring for the paging signaling associated with the second subscription during the multiple suspended tune away occasions based at least in part on the second control signaling.

29. The apparatus of claim 18, wherein the first subscription of the UE corresponds to a first universal subscriber identity module in a connected mode and the second subscription of the UE corresponds to a second universal subscriber identity module in an idle mode.

30. A non-transitory computer-readable medium storing code for wireless communications at a user equipment (UE), the code comprising instructions executable by one or more processors to:
transmit, to a first base station associated with a first subscription of the UE, first control signaling indicating a configuration for a plurality of tune away occasions;
monitor for paging signaling from a second base station associated with a second subscription of the UE during a first tune away occasion of the plurality of tune away occasions;
transmit, to the first base station associated with the first subscription, second control signaling indicating tune away occasion suspension and a quantity of tune away occasions of the plurality of tune away occasions based at least in part on the configuration;
suspend multiple tune away occasions based at least in part on the second control signaling, wherein a quantity of the multiple suspended tune away occasions is the quantity of tune away occasions indicated by the second control signaling; and
communicate data with the first base station associated with the first subscription during at least a portion of the multiple suspended tune away occasions.

* * * * *